(12) United States Patent
Xiong et al.

(10) Patent No.: US 11,622,377 B2
(45) Date of Patent: *Apr. 4, 2023

(54) SCHEDULING REQUEST FOR STANDALONE DEPLOYMENT OF A SYSTEM USING BEAMFORMING

(71) Applicant: APPLE INC., Cupertino, CA (US)

(72) Inventors: Gang Xiong, Portland, OR (US); Wenting Chang, Beijing (CN); Huaning Niu, San Jose, CA (US); Yushu Zhang, Beijing (CN); Yuan Zhu, Beijing (CN)

(73) Assignee: APPLE INC., Cupertino, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/368,638

(22) Filed: Jul. 6, 2021

(65) Prior Publication Data
US 2021/0337561 A1    Oct. 28, 2021

Related U.S. Application Data

(63) Continuation of application No. 16/071,439, filed as application No. PCT/US2016/045372 on Aug. 3, 2016, now Pat. No. 11,096,195.
(Continued)

(51) Int. Cl.
*H04W 72/50*    (2023.01)
*H04W 76/27*    (2018.01)
(Continued)

(52) U.S. Cl.
CPC ........ *H04W 72/535* (2023.01); *H04B 7/0695* (2013.01); *H04B 7/088* (2013.01);
(Continued)

(58) Field of Classification Search
CPC .............. H04W 72/1257; H04W 76/27; H04B 7/0695; H04B 7/088; H04L 5/0051; H04L 27/2607
See application file for complete search history.

(56) References Cited

U.S. PATENT DOCUMENTS

| | | | |
|---|---|---|---|
| 10,271,295 B2 * | 4/2019 | Tsai | H04B 7/0695 |
| 11,096,195 B2 * | 8/2021 | Xiong | H04B 7/088 |
| 2014/0036803 A1 | 2/2014 | Park et al. | |

(Continued)

FOREIGN PATENT DOCUMENTS

| | | |
|---|---|---|
| WO | 2015033930 A1 | 3/2015 |
| WO | 2017138980 A1 | 8/2017 |

OTHER PUBLICATIONS

U.S. Appl. No. 16/071,439, Notice of Allowance, dated Apr. 14, 2021, 9 pages.
(Continued)

*Primary Examiner* — Kashif Siddiqui
(74) *Attorney, Agent, or Firm* — Dorsey & Whitney LLP

(57) ABSTRACT

Technology for a user equipment (UE) using a self-contained scheduling resource to communicate with an eNodeB within a wireless communication network is disclosed. The UE can select, at the UE, a selected eNodeB transmission (Tx) beam and a selected UE reception (Rx) beam based on a highest power beamforming reference signal (BRS) received power (BRS-RP). The UE can signal a transceiver of the UE to transmit to the eNodeB a scheduling request (SR), using the selected Rx beam, on a scheduling request (SR) resource in a self-contained subframe according to a time and frequency location of the selected eNodeB Tx beam. The UE can process an advanced physical downlink control channel (xPDCCH), received from the eNodeB, for an uplink (UL) grant using the selected UE RX beam.

20 Claims, 15 Drawing Sheets

Related U.S. Application Data

(60) Provisional application No. 62/294,095, filed on Feb. 11, 2016.

(51) Int. Cl.
   *H04B 7/06* (2006.01)
   *H04B 7/08* (2006.01)
   *H04L 5/00* (2006.01)
   *H04L 27/26* (2006.01)

(52) U.S. Cl.
   CPC ........ *H04L 5/0051* (2013.01); *H04L 27/2607* (2013.01); *H04W 76/27* (2018.02)

(56) References Cited

U.S. PATENT DOCUMENTS

| | | | |
|---|---|---|---|
| 2015/0372730 A1 | 12/2015 | Hejazi et al. | |
| 2017/0208583 A1* | 7/2017 | Jiang | H04L 5/1469 |
| 2017/0367120 A1* | 12/2017 | Murray | H04L 5/0023 |
| 2019/0013908 A1* | 1/2019 | Xiong | H04L 5/0037 |
| 2021/0076397 A1 | 3/2021 | Xiong et al. | |

OTHER PUBLICATIONS

U.S. Appl. No. 16/071,439, Non-Final Office Action, dated Jan. 4, 2021, 6 pages.

Lahetkangas, Eeva, et al., "On the flexible 5G dense deployment air interface for mobile broadband", 1st International Conference on 5G for Ubiquitous Connectivity (5GU), 2014, 5 pages.

PCT/US2016/045372, International Search Report and Written Opinion, dated Oct. 7, 2016, 11 pages.

* cited by examiner

1100

Broadcast a beamforming reference signal (BSR) to enable the UE to select an selected eNodeB transmission (Tx) beam and an selected UE reception (Rx) beam based on the BSR — 1110

Process a scheduling request (SR) on a SR resource in a self-contained subframe, received from the UE, according to a time and frequency location of the selected eNodeB Tx beam — 1120

Encode, for transmission to the UE, an advanced physical downlink control channel (xPDCCH) for an uplink (UL) grant using the selected eNodeB TX beam — 1130

FIG. 11

SCHEDULING REQUEST FOR STANDALONE DEPLOYMENT OF A SYSTEM USING BEAMFORMING

BACKGROUND

Wireless mobile communication technology uses various standards and protocols to transmit data between a node (e.g., a transmission station such as an eNodeB) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as Wi-Fi. In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node to the wireless device (e.g., UE), and the uplink (UL) transmission can be a communication from the wireless device to the node.

Broader bandwidth communication can be accomplished using higher frequency bands, such as centimeter (cm) wave and millimeter (mm) wave carrier frequencies. However, higher frequency bands can have significant losses in the atmosphere due, in part, to absorption by oxygen and water vapor in the atmosphere. Advances are desired in the way signals are communicated in 3GPP systems to allow these higher frequency bands to be used.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 11 depicts additional functionality of an eNodeB operable to communicate with a User Equipment (UE), within a wireless communication network, using a scheduling request transmission for a mmWave system in accordance with an example;

Figure 1:
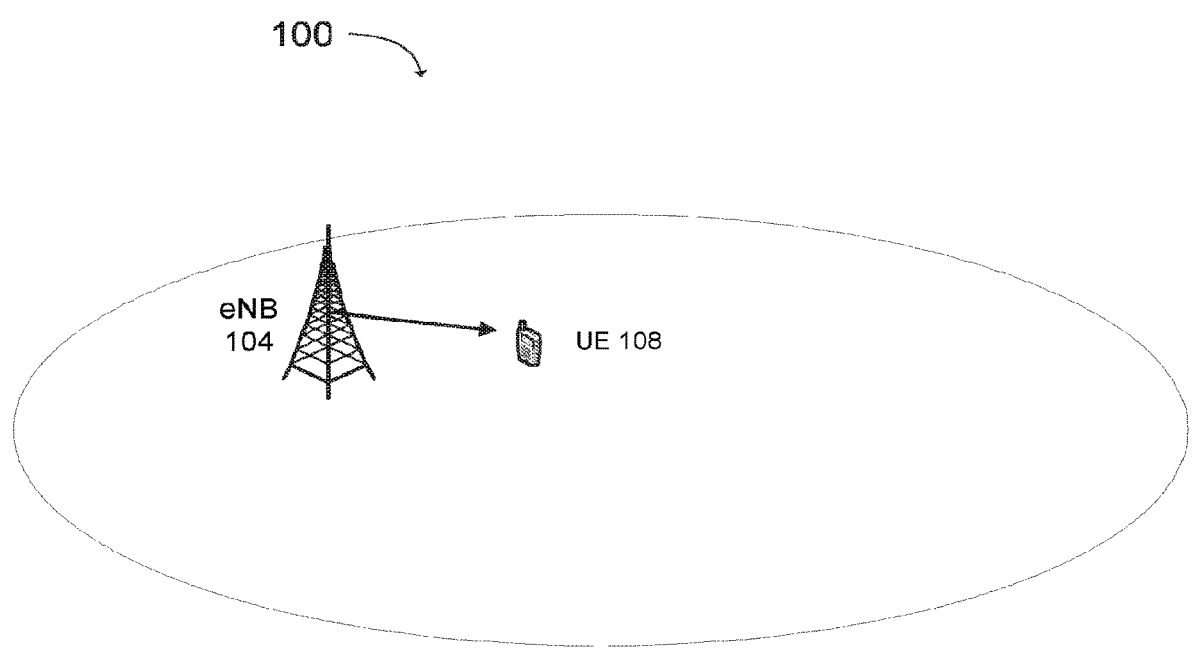
FIG. 1 illustrates a mobile communication network within a cell in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communication has evolved significantly from early voice systems to today's highly sophisticated integrated communication platform. A Third generation partnership project (3GPP) next generation wireless communication system fifth generation (5G) can provide access to information and sharing of data anywhere, anytime by various users and applications. In one aspect, 5G can be a unified network/system targeted to meet vastly different, and often times conflicting, performance dimensions and services. Such diverse multi-dimensional constraints can be driven by different services and applications. In general, 5G will evolve based on 3GPP LTE-Advanced with additional potential new Radio Access Technologies (RATs) to enrich the lives of users with more efficient, simple and seamless wireless connectivity solutions.

However, in existing 3GPP LTE specifications, such as Rel. 12, during an uplink data transmission in existing 3GPP LTE systems, when a UE intends to transmit the data in the uplink, the UE will request the resource using a physical uplink control channel (PUCCH) format 1 for a scheduling request (SR). After successful detection of the SR, the eNB can transmit the physical downlink control channel (PDCCH) with a downlink control information (DCI) format containing an uplink grant to allocate the uplink resource. Subsequently, a UE can send a buffer status report (BRS) on a physical uplink shared channel (PUSCH) in the allocated uplink resource. The BRS can be carried in a Medium Access Control (MAC) Protocol Data Unit (PDU), which can be used to inform the eNB of the amount of the data in the UE's buffer to be transmitted. Based on the BRS information, the eNB can allocate the appropriate resource and modulation and coding scheme (MCS) which is included in the uplink grant. After receiving the uplink grant, the UE can transmit the uplink data on PUSCH However, for 3GPP 5G systems, high frequency band communications can provide wider bandwidth, as compared to existing 3GPP LTE specifications, to support the one or more various types of integrated communication systems (including future integrated communication systems). These wider bandwidth communication systems can use RATs that are configured for high bandwidth communication on wideband carriers at high cm and mm wave bands that have relatively high losses relative to the 500 MHz to 3 GHz bands used in Rel. 12. Beam forming can be a critical technology for the implementation of high frequency band system due to the fact that the beam forming gain can compensate for the severe path loss caused by atmospheric attenuation. Beam forming can also improve the signal-to-noise ratio (SNR) and enlarge the coverage area of a cell. By aligning a transmission (Tx) beam to a target UE, the radiated energy can be focused for higher energy efficiency, and the mutual UE interference can be suppressed.

For centimeter Wave (cmWave) (e.g., small cells deployed using 6-30 Gigahertz "GHz" with a 500 megahertz "MHz" carrier bandwidth) and millimeter Wave (mmWave) (e.g., small cells deployed up to 100 GHZ with a 2 GHz carrier bandwidth) systems, when the UE intends to request a resource for uplink data transmission, the eNB may not know the exact reception (Rx) beam for the scheduling request reception.

In future 3GPP next generation wireless communication systems (e.g., 3GPP 5G or 3GPP 6G) operable to communicate on cmWave and mmWave carrier frequencies, the small cells can be configured as standalone cells or non-standalone cells. In non-standalone, a macro cell can be configured to serve as a primary cell. The small cell (cmWave or mmWave) can be configured to serve as a secondary cell, mainly for high data rate transmission. In a standalone deployment, no macro cell may be used as a primary cell. Thus, the cmWave or mmWave cell (e.g. small cell) can be the primary cell.

For a standalone deployment scenario, one or more factors may be essential to ensure robust reception of scheduling request. Further, the scheduling request may carry certain eNB Tx beam information to enable the eNB to subsequently transmit an advanced physical downlink control channel (xPDCCH) using the appropriate Tx and/or Rx beams. Accordingly, the present technology provides a solution for scheduling requests for a standalone deployment in a mmWave system. While examples of mmWave systems are provided, this is not intended to be limiting. The same technology can also be applied to cmWave systems as well.

In one aspect, the present technology provides a scheduling request (SR) procedure for standalone deployment using resource allocation of the SR transmission, which can include a one-to-one association between a beamforming reference signal (BRS) antenna port (AP) and the SR transmission resource.

In one aspect, the present technology provides for a user equipment (UE) using a self-contained scheduling resource to communicate with an eNodeB within a wireless communication network. The UE can determine, at the UE, a selected eNodeB transmission (Tx) beam and a selected UE reception (Rx) beam from a beamforming reference signal (BRS). In one aspect, based on channel reciprocity, an eNodeB Tx beam can be the UE Rx beam. One or more processors operating in the UE can signal a transceiver of the UE to transmit to the eNodeB a scheduling request (SR), using the selected Rx beam, on an SR resource in a self-contained subframe according to a time and frequency location of the selected eNodeB Tx beam. The UE can process a selected physical downlink control channel (xPDCCH), received from the eNodeB, for an uplink grant (UL) using the selected UE RX beam.

FIG. 1 illustrates a mobile communication network within a cell 100 having an evolved node B (eNB or eNodeB) with a mobile device. FIG. 1 illustrates an eNB 104 that can be associated with an anchor cell, macro cell or primary cell. Also, the cell 100 can include a mobile device, such as, for example, a User Equipment (UE or UEs) 108 that can be in communication with the eNB 104. The eNB 104 can be a station that communicates with the UE 108 and can also be referred to as a base station, a node B, an access point, and the like. In one example, the eNB 104 can be a high transmission power eNB, such as a macro eNB, for coverage and connectivity. The eNB 104 can be responsible for mobility and can also be responsible for radio resource control (RRC) signaling. The UE or UEs 108 can be supported by the macro eNB 104. The eNB 104 can provide communication coverage for a particular geographic area. In 3GPP, the term "cell" can refer to a particular geographic coverage area of eNB and/or an eNB subsystem serving the coverage area with an associated carrier frequency and a frequency bandwidth, depending on the context in which the term is used.

Figure 2:
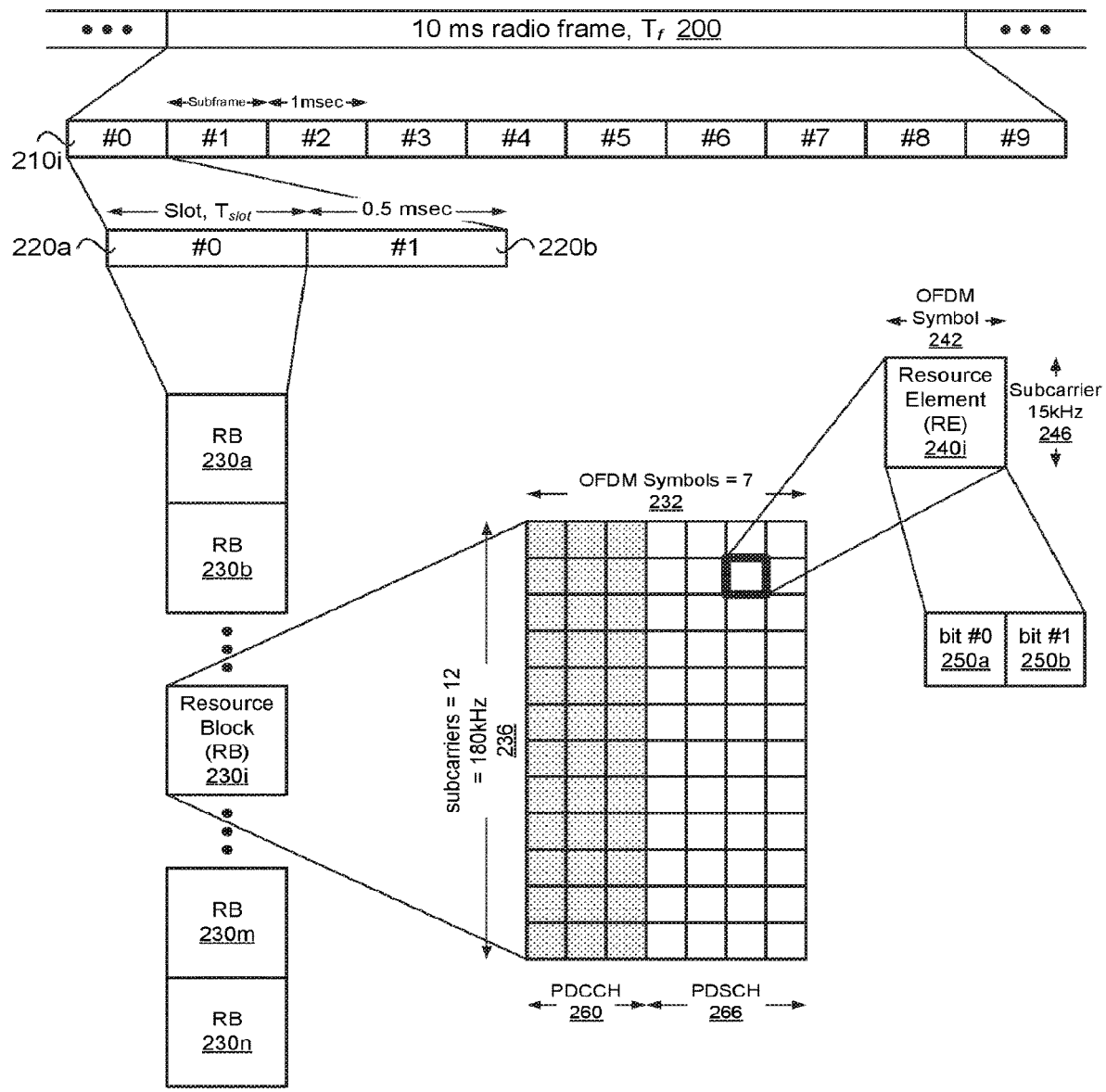
FIG. 2 illustrates a diagram of radio frame resources (e.g., a resource grid) for a downlink (DL) transmission including a physical downlink control channel (PDCCH) in accordance with an example.

FIG. 2 illustrates a legacy 3GPP Rel. 8 diagram of radio frame resources (e.g., a resource grid) for a downlink (DL) transmission including a physical downlink control channel (PDCCH) in accordance with an example. In the example, a radio frame 200 of a signal used to transmit the data can be configured to have a duration, Tf, of 10 milliseconds (ms). Each radio frame can be segmented or divided into ten subframes 210*i* that are each 1 ms long. Each subframe can be further subdivided into two slots 220*a* and 220*b*, each with a duration, Tslot, of 0.5 ms. In one example, the first slot (#0) 220a can include a physical downlink control channel (PDCCH) 260 and/or a physical downlink shared channel (PDSCH) 266, and the second slot (#1) 220b can include data transmitted using the PDSCH.

Each slot for a component carrier (CC) used by the node and the wireless device can include multiple resource blocks (RBs) 230a, 230b, 230i, 230m, and 230n based on the CC frequency bandwidth. The CC can include a frequency bandwidth and a center frequency within the frequency bandwidth. In one example, a subframe of the CC can include downlink control information (DCI) found in the PDCCH. The PDCCH in the control region can include one to three columns of the first OFDM symbols in a subframe or physical RB (PRB), when a legacy PDCCH is used. The remaining 11 to 13 OFDM symbols (or 14 OFDM symbols, when legacy PDCCH is not used) in the subframe can be allocated to the PDSCH for data (for short or normal cyclic prefix). For example, as used herein, the term 'slot' may be used for 'subframe', or 'transmission time interval (TTI)' can be used for 'frame' or 'frame duration'. In addition, a frame may be considered a user transmission specific quantity (such as a TTI associated with a user and a data flow).

Each RB (physical RB or PRB) 230i can include 12 subcarriers 236 of 15 kHz subcarrier spacing, for a total of 180 kHz per RB (on the frequency axis) and 6 or 7 orthogonal frequency-division multiplexing (OFDM) symbols 232 (on the time axis) per slot. The RB can use seven OFDM symbols if a short or normal cyclic prefix is employed. The RB can use six OFDM symbols if an advanced cyclic prefix is used. The resource block can be mapped to 84 resource elements (REs) 240i using short or normal cyclic prefixing, or the resource block can be mapped to 72 REs (not shown) using advanced cyclic prefixing. The RE can be a unit of one OFDM symbol 242 by one subcarrier (i.e., 15 kHz) 246.

In the example of FIG. 2, each RE can transmit two bits 250a and 250b of information in the case of quadrature phase-shift keying (QPSK) modulation. Other types of modulation can be used, such as 16 quadrature amplitude modulation (QAM) to transmit 4 bits of information per RE, 64 QAM to transmit 6 bits of information in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Scheduling Request Procedure for Standalone Deployment

Figure 3:
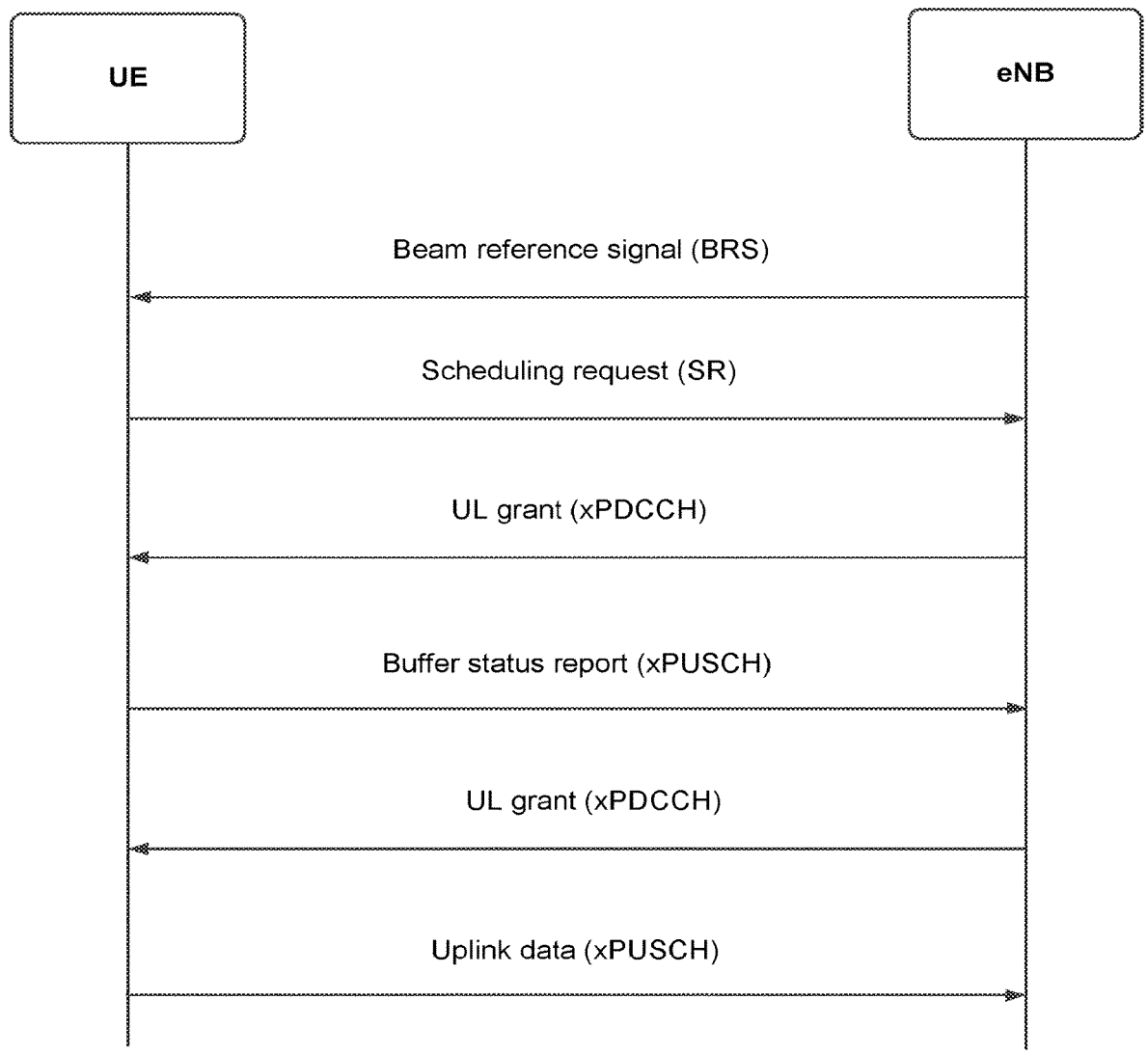
FIG. 3 illustrates a flow diagram of a scheduling request transmission in accordance with an example.

Turning now to FIG. 3, a flow diagram of a scheduling request transmission procedure for a mmWave system is depicted. For a standalone deployment scenario, the Tx and Rx beam direction can be aligned between eNodeB and UE to enable reliable communication in a mmWave band. As compared to a legacy SR procedure in 3GPP LTE, embodiments of the present technology enable a beam reference signal (BRS) to be transmitted from an eNodeB to allow the UE to measure the BRS received power (BRS-RP) and obtain a selected eNodeB Tx beam and UE Rx beam. In one embodiment, the selected eNodeB Tx beam, which can be reciprocal with the UE Rx beam, can have a BRS-RP with a BRS-RP that has a highest amplitude or a highest received power BRS-RP as compared to the BRS-RP for other eNodeB Tx beams.

Figure 4:
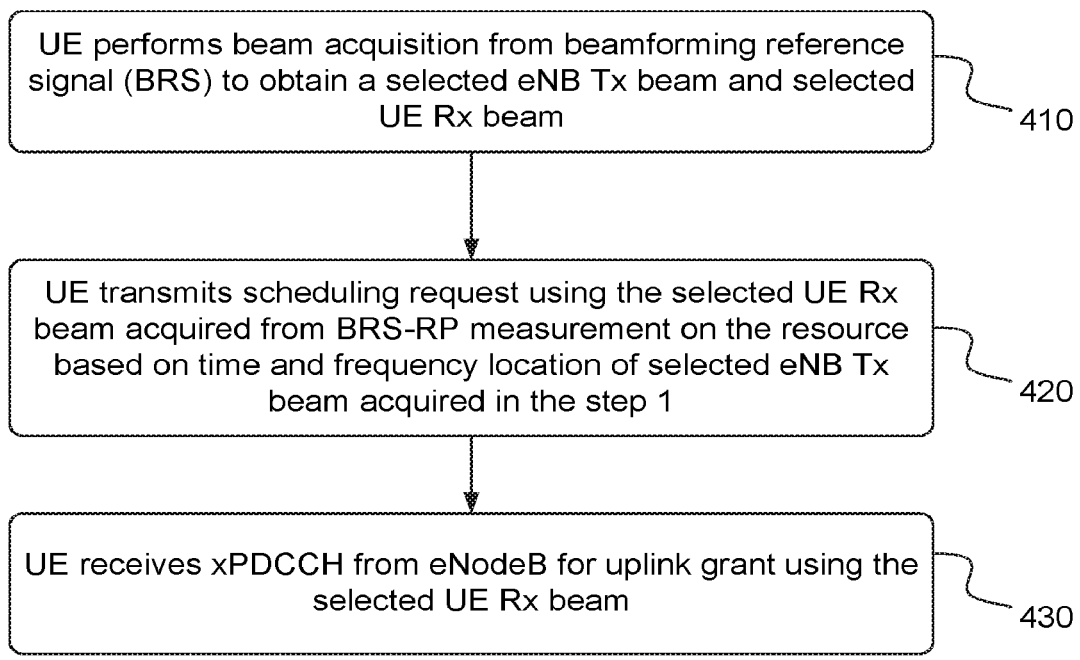
FIG. 4 illustrates a flow diagram of a scheduling request transmission for standalone in a mmWave system in accordance with an example.

More specifically, FIG. 4 illustrates a flow diagram for the transmission of the SR for standalone deployment in an mmWave system. In particular, at block 410, the UE can perform beam acquisition from beamforming reference signal (BRS) to obtain a selected eNB Tx beam and corresponding UE Rx beam. At block 420, the UE can transmit a scheduling request (SR) using a selected UE Rx beam acquired from BRS-RP measurement on the resource based on time and frequency location of a selected eNB Tx beam. It should be noted that a one to one association rule may have to be defined between SR transmission resource and BRS antenna port (AP). Under the assumption of channel reciprocity in a TDD system, when the eNodeB successfully detects the SR transmission on a certain resource, it can determine the selected eNodeB Tx beam for this particular UE for subsequent control and data transmission and reception for a selected period of time. At block 430, the UE can receive an advanced physical downlink control channel (xPDCCH) (which can also be known as a 3GPP 5G physical downlink control channel) from an eNodeB containing an uplink grant using the UE Rx beam acquired in block 410. It should be noted that in block 430, the eNodeB can transmit the xPDCCH using the selected Tx beam acquired in block 420 upon successful SR detection.

Resource Allocation of SR Transmission

In one aspect, a subframe structure for SR transmission can be based on a self-contained subframe structure. The xPDCCH can be transmitted at a beginning of the subframe and an advanced physical uplink control channel (xPUCCH) (which can also be known as a 3GPP 5G physical uplink control channel) can be transmitted at the last part of the subframe. Thus, turning now to FIGS. 5A-5C, scheduling request resources in a self-contained subframe in three options are depicted. By way of example only, four SR resources, such as, for example, SR resource #1, SR resource #2, SR resource #3, and SR resource #4, are illustrated. However, more SR resources may be included or used.

Figure 5A:
FIG. 5A illustrates a diagram of a scheduling request resource in a self-contained subframe in a first option in accordance with an example.

FIG. 5A depicts the SR resource for a self-contained subframe structure in a first option ("option 1"). In FIG. 5A, four SR resources, such as, for example, SR resource #1, SR resource #2, SR resource #3, and SR resource #4 can be configured within the UL subframe. The self-contained subframe can comprise an advanced physical downlink control channel (xPDCCH), a guard period (GP), one or more additional SR resources (e.g., SR resource #1, SR resource #2, SR resource #3, and SR resource #4), and an advanced physical uplink control channel (xPUCCH). The xPDCCH and the guard period can be located within an UL self-contained subframe prior to each of the SR resources (e.g., SR resource #1, SR resource #2, SR resource #3, and SR resource #4), and/or the xPUCCH. The xPUCCH can be located after each of the SR resources. In FIG. 5A, one SR resource can span 11 orthogonal frequency-division multiplexing (OFDM) symbols.

In one aspect, the guard period can be inserted after the xPDCCH in order to accommodate the downlink-to-Uplink (DL-to-UL) and UL-to-DL switching time and round-trip propagation delay. Further, an advanced physical uplink shared channel (xPUSCH) (also known as 3GPP 5G physical uplink shared channel), the SR, and/or the advance physical random access channel (xPRACH) (also known as 3GPP 5G physical random access channel) can be multiplexed in a frequency division multiplexing (FDM) manner within the same subframe. It should be noted that a total number of SR resources in the frequency domain can be configured in a cell specific manner by higher layers via an advanced master information block (xMIB) (e.g., a 3GPP LTE 5G xMIB), an advanced system information block (xSIB) (e.g., a 3GPP LTE 5G xSIB), or radio resource control (RRC) signaling.

Figure 5B:
FIG. 5B illustrates a diagram of a scheduling request resource in a self-contained subframe in a second option in accordance with an example.

As depicted in FIG. 5B, a second option ("option 2") depicts the self-contained subframe comprising an advanced physical downlink control channel (xPDCCH), a guard period (GP), and one or more additional SR resources (e.g., SR resource #1, SR resource #2, SR resource #3, and SR resource #4). The xPDCCH and the guard period can be located within the self-contained subframe prior to the one or more SR resources (e.g., SR resource #1, SR resource #2, SR resource #3, and SR resource #4). In addition, in this example, one SR resource (e.g., SR resource #1, SR resource #2, SR resource #3, and/or SR resource #4) can span 12 OFDM symbols.

Figure 5C:
FIG. 5C illustrates a diagram of a scheduling request resource in a self-contained subframe in a third option in accordance with an example.

As depicted in FIG. 5C, a third option ("option 3") depicts the self-contained subframe comprising one or more SR resources (e.g., SR resource #1, SR resource #2, SR resource #3, and/or SR resource #4) occupying at least fourteen orthogonal frequency-division multiplexing (OFDM) symbols of the self-contained subframe.

It should be noted that the SR transmission for one or more users (e.g., multiple users) can be multiplexed using frequency-division multiplexing (FDM), Code Division Multiplexing (CDM), or a combination of the FDM and the CDM. In one aspect, when using CDM based multiplexing and when Zadoff-Chu (ZC) sequence is adopted for SR transmission, one or more different users may be configured with a dedicated cyclic shift value for SR transmission. A root index for ZC based SR transmission can be defined as a function of physical cell identification (ID) and subframe or slot or symbol index to identify an SR transmission for a selected user.

In one aspect, in order to enable the UE to utilize an SR to carry the eNodeB Tx beam information, a one-to-one resource association between a BRS antenna port (AP) and the SR resource can be defined. Further, a subframe gap between the BRS transmission and a corresponding SR transmission can be predefined in the specification or configured by higher layers via xMIB, xSIB, and/or RRC signaling.

For example, in one aspect, subframe 0 in one radio frame can be defined for a BRS transmission, while the corresponding SR transmission can be allocated in subframe 5. The SR transmission can be allocated within the same subframe when xPRACH is configured. Given the periodicity of eNB Tx beam sweeping, one or more alignments between the BRS and SR transmission can be defined to ensure the eNodeB to detect the SR transmission using the proper Rx beam. In one aspect, the SR can be transmitted in a next opportunity after BRS transmission.

Example Embodiments for the Resource Allocation of SR Transmission

In one aspect, a one-to-one resource association between the BRS antenna port and SR resource in time and frequency domain can be defined. Further, the UE can transmit the SR using a dedicated resource index which can be configured by higher layers via UE specific RRC signaling. In addition, the UE can select the time and frequency resource for SR transmission which can have a one-to-one association on the time and frequency resource where the selected eNB Tx beam or BRS antenna port (AP) is located.

According to this transmission scheme, the eNB can use the same Tx beam for BRS transmission to apply on the SR reception on the same time and frequency position. Under the assumption of channel reciprocity, the eNB selected Tx beam information can be carried by the SR resource index in time and frequency domain.

Figure 6:
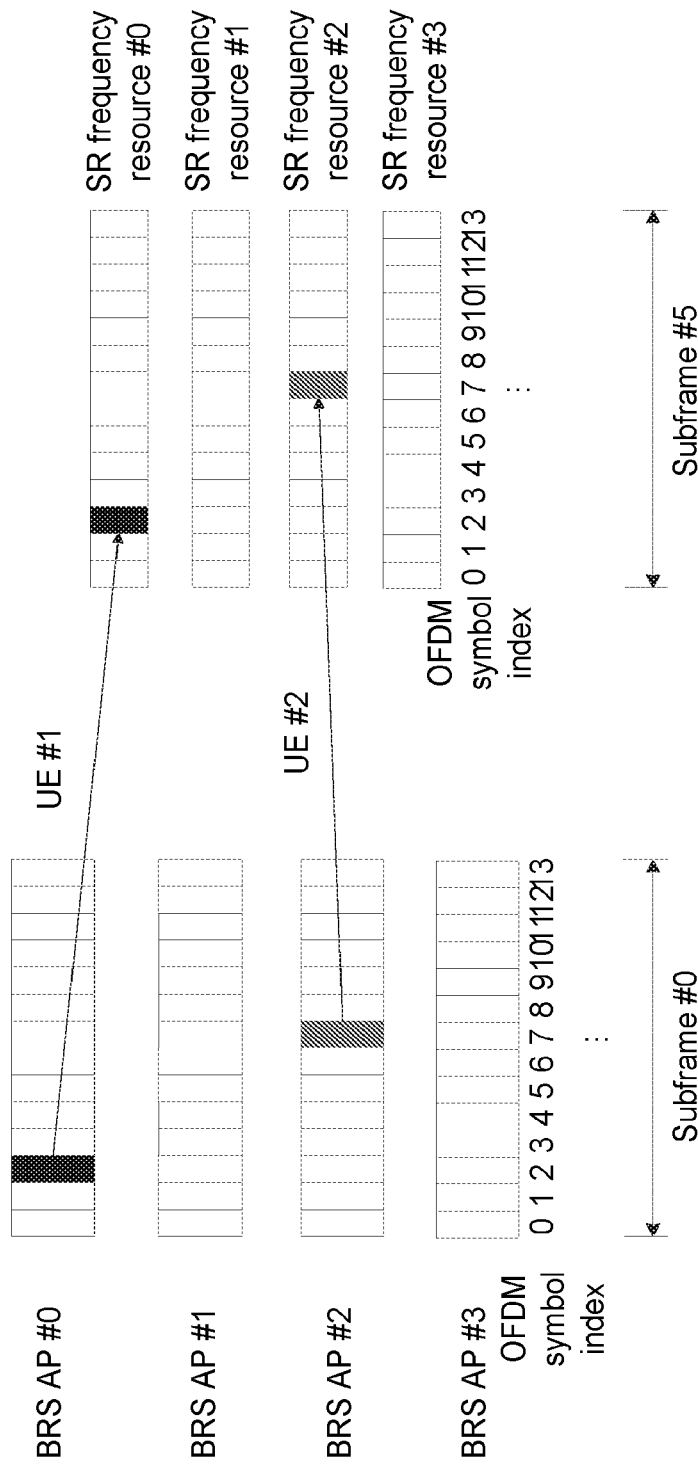
FIG. 6 illustrates a diagram having a one-to-one association between a beamforming reference signal (BRS) in time and frequency domain in accordance with an example.

Turning now to FIG. 6, a diagram having a one-to-one association between a beamforming reference signal (BRS) in time and frequency domain. That is, FIG. 6 depicts one example of one-to-one association between the BRS AP and SR resource in time and frequency domain. In FIG. 6, in subframe #0, the UE can measure the BRS received power (BRS-RP) and can determine the selected eNB Tx beam. As depicted in FIG. 6, for UE #1, the selected eNB Tx beam can be located at BRS beam group #0 and 3rd OFDM symbol. For UE #2, the selected eNB Tx beam can be located at BRS beam group #2 and 8th OFDM symbol. The one-to-one association between BRS AP and SR resource can be defined. For example, BRS AP #0 can be associated with SR frequency resource #0, BRS AP #1 can be associated with SR frequency resource #1, and so forth. In one aspect, based on a mapping rule, UE #1 can transmit the SR, in the subframe #5, in SR frequency resource #0, and/or in the 3rd OFDM symbol using a configured SR resource index. Similarly, UE #2 can transmit SR in the subframe #5, in SR frequency resource #2, and/or in the 8th OFDM symbol.

It should be noted that although shown in FIG. 6, each BRS AP can be transmitted using a localized transmission (i.e., one BRS AP can span N contiguous subcarriers in the frequency domain where N is a positive integer and/or BRS AP can also be transmitted in a distributed manner.

Figure 7:
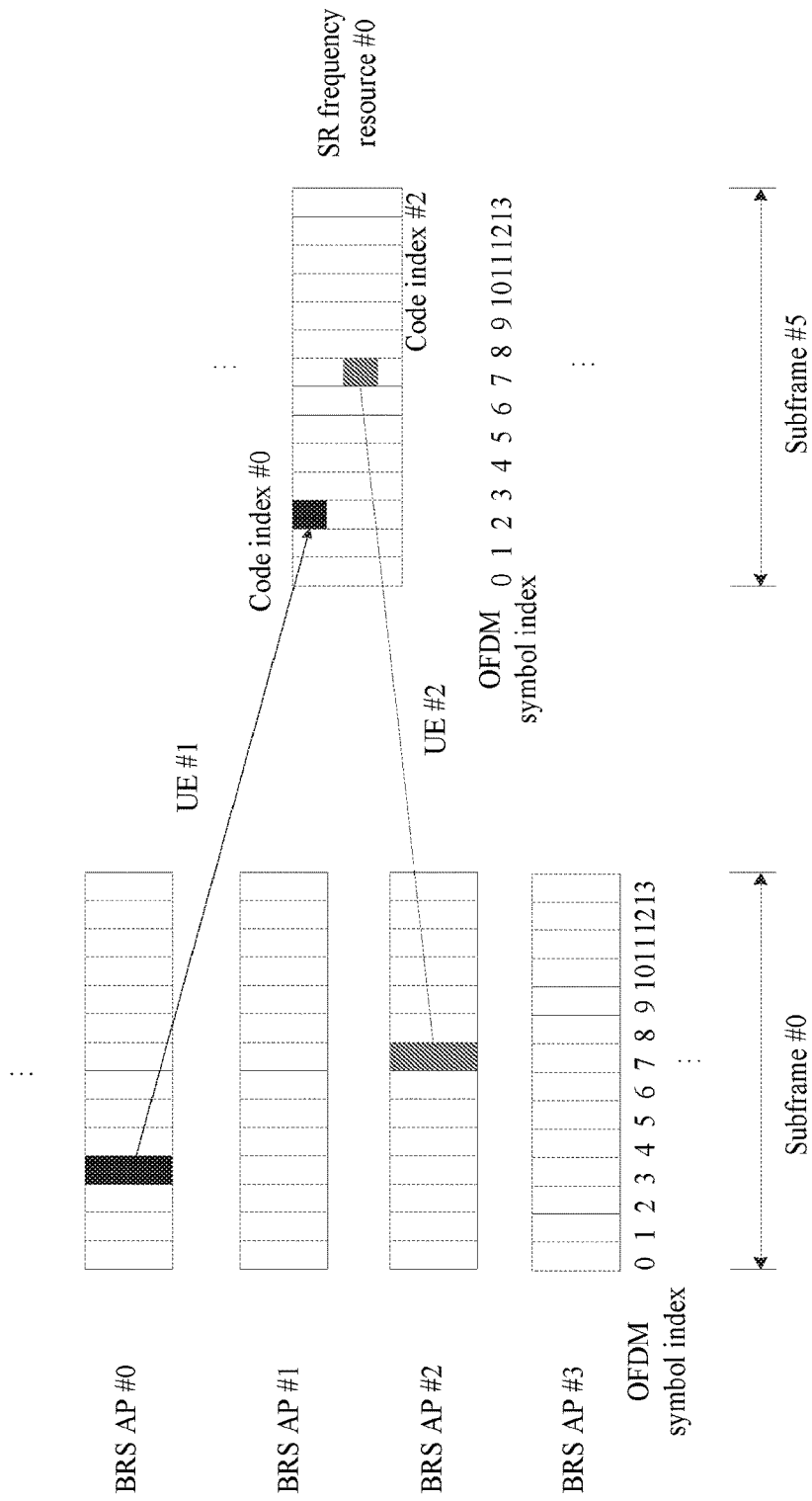
FIG. 7 illustrates a diagram having a one-to-one association between a beamforming reference signal (BRS) in time and code domain in accordance with an example.

In an additional embodiment, a one-to-one resource association between BRS antenna port and SR resource in time and code domain can be defined. FIG. 7 illustrates a diagram having a one-to-one association between a beamforming reference signal (BRS) in time and code domain. In particular, a UE can be configured with K SR resource index, where K is a total number of BRS APs. In FIG. 7, the UE can select the time and code resource for SR transmission which has one-to-one association on the time and frequency resource where the eNB selected Tx beam is located. That is, FIG. 7 depicts an example of a one-to-one association between BRS AP and SR resource in time and code domain. In FIG. 7, one SR frequency resource can be configured in a cell specific manner. Cell specific may refer to a configuration that is common for all UE's in a particular Cell. Within each resource, one UE is configured with 4 code indexes which have one to one association with BRS AP. In one aspect, where 8 cyclic shift (CS) values can be defined for SR transmission, UE #1 can be configured with CS value $\{0, 2, 4, 6\}$ and UE #2 may be configured with CS value $\{1, 3, 5, 7\}$.

In one aspect, a one-to-one association can be defined between BRS AP and SR code index. For example, BRS AP #0 can be associated with SR code index #0, BRS AP #1 can be associated with SR code index #1, and so forth. Based on a mapping rule, the UE #1 can transmit the SR in subframe #5 using configured SR codex index #0 in 3rd OFDM symbol. Similarly, UE #2 can transmit the SR in the subframe #5 using configured SR codex index #2 in 8th OFDM symbol.

In one aspect, a one-to-one resource association can be defined between a BRS antenna port and SR resource in a time, code, and/or frequency domain. The UE can be configured with $M_0$ SR resource indexes, where $M_0$ is a positive integer and $M_0 < K$, where K is a total number of BRS APs. Further, $M_1$ SR frequency resources can be configured by higher layers in a cell specific manner, where $M_1$ is a positive integer and $M_0 \cdot M_1 = K$. For example, the UE can select the time, code, and/or frequency resource for the SR transmission, which can have a one-to-one association on the time and frequency resource where the eNB selected Tx beam is located.

In an additional aspect, "L" SR resource can be defined, where L is greater than K (e.g., L>K), where K is a total number of BRS APs. In this case, a one-to-many resource association can be defined between the BRS AP and SR resource in the time and frequency domain. The UE can randomly choose one SR frequency resource to transmit the SR according to the one to many resource association rule.

Figure 8:
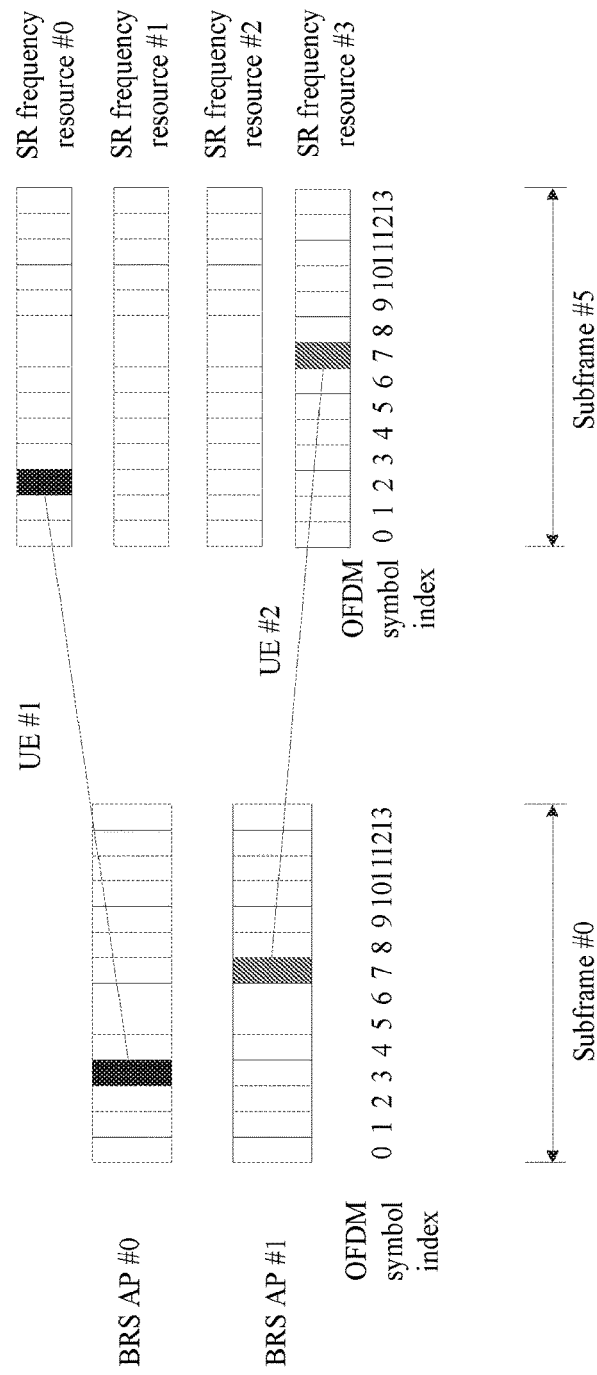
FIG. 8 illustrates a diagram having a one-to-many association between a beamforming reference signal (BRS) in time and frequency domain in accordance with an example.

FIG. 8 illustrates an example of a one-to-many association between BRS AP and SR resource in time and frequency domain. That is, FIG. 8 depicts a one-to-many association between a beamforming reference signal (BRS) AP and a SR resource in time and frequency domain. In FIG. 8, two BRS APs (BRS AP #0 and BSR AP #1) and four SR frequency resources (e.g., SR resource #1, SR resource #2, SR resource #3, and SR resource #4) can be configured. For example, BRS AP #0 can be associated with SR frequency resource #0 and #1, while BRS AP #1 can be associated with SR frequency resource #2 and #3.

Based on a mapping rule, UE #1 can randomly choose one SR frequency resource from SR frequency resource #0 and #1. The UE can transmit the SR in the subframe #5 in SR frequency resource #0 and 3rd OFDM symbol using a configured SR resource index. Similarly, UE #2 transmits SR in the subframe #5 in SR frequency resource #3 in 8th OFDM symbol.

Figure 9:
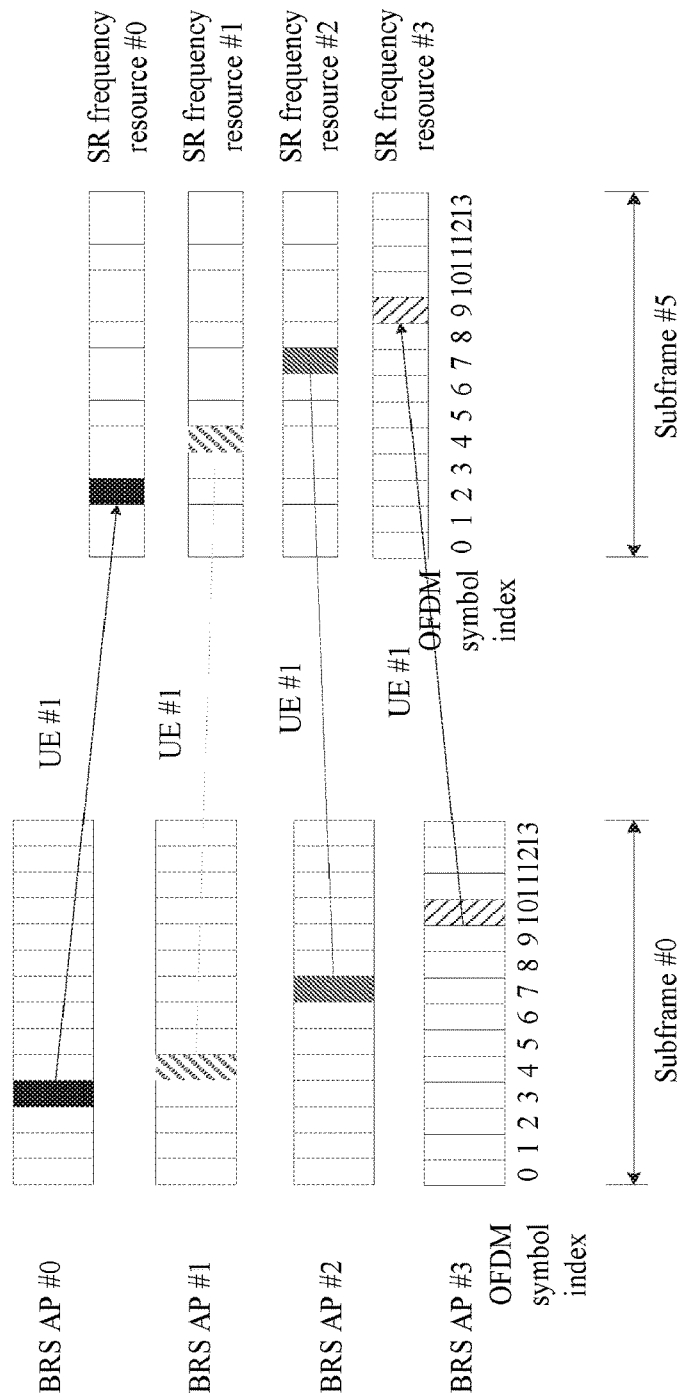
FIG. 9 illustrates a diagram for transmission of scheduling requests (SR) in N number of SR resources in accordance with an example.

In an additional embodiment, to improve the SR detection performance, a UE can simultaneously transmit the SR on "N" SR resources, where N is a positive integer and can be predefined, and/or configured by higher layers via xMIB, xSIB, and/or RRC signaling. It should be noted that the N SR transmissions can correspond to N selected eNB Tx beams with N BRS-RP having a highest level of received power as compared to other BRS-RP. Turning now to FIG. 9 a diagram for transmission of scheduling requests (SR) in an N number of SR resources is illustrated. That is, FIG. 9 depicts one example of an SR transmission in four SR resources (e.g., SR resource #1, SR resource #2, SR resource #3, and SR resource #4). In one aspect, the UE can transmit the SR in 3rd OFDM symbol, in the SR frequency resource #0, in the 5th OFDM symbol in SR frequency resource #1, in the 8th OFDM symbol in SR frequency resource #2, and/or in the 10th OFDM symbol in SR frequency resource #3.

Figure 10:
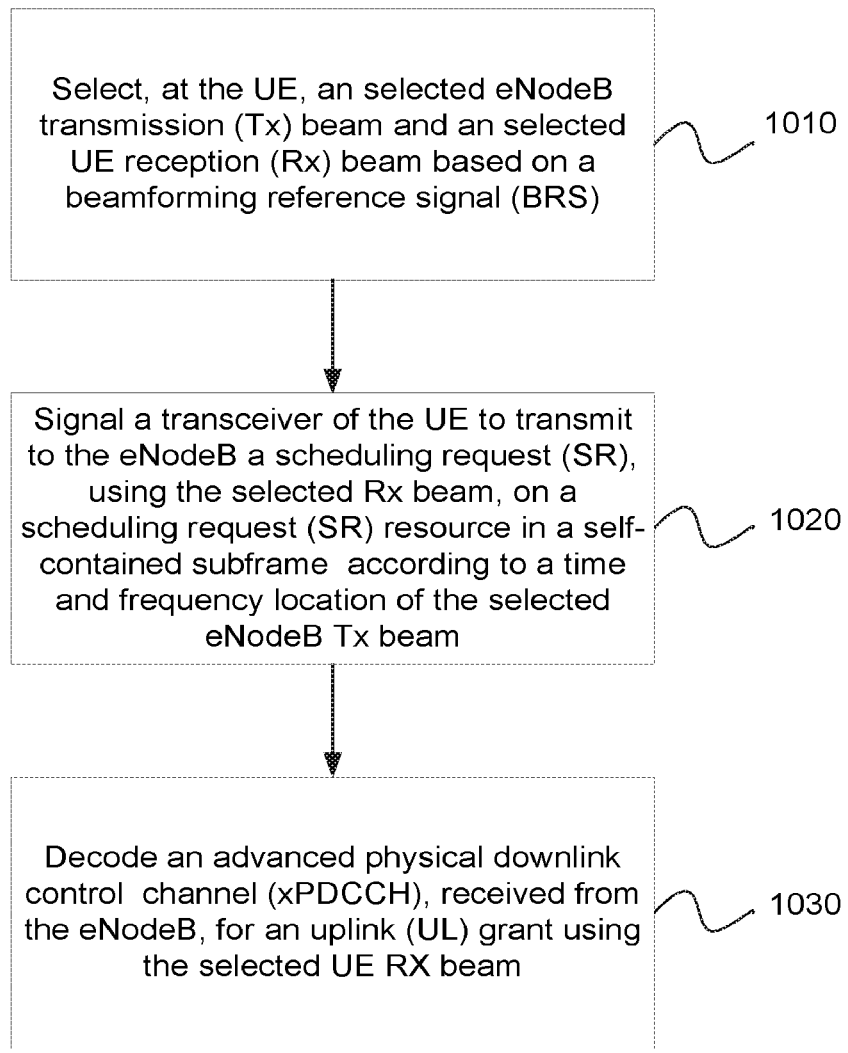
FIG. 10 depicts additional functionality of a user equipment (UE) operable to communicate with an eNodeB, within a wireless communication network, using a scheduling request transmission for a mmWave system in accordance with an example.

Turning now to FIG. 10, an example provides functionality 900 of a User Equipment (UE) to communicate with an eNodeB, within a wireless communication network, using a scheduling request transmission for a mmWave system, as shown in the flow chart in FIG. 10. The functionality 1000 can be implemented as a method or the functionality can be executed as instructions on a machine, where the instructions are included one or more computer readable mediums or one or more non-transitory machine readable storage mediums. The UE can comprise one or more processors and memory configured to: select, at the UE, a selected eNodeB transmission (Tx) beam and a selected UE reception (Rx) beam based on a beamforming reference signal (BRS) received power (BRS-RP), which can be a BRS-RP having a highest level of received power as compared to other BRS-RP, as in block 1010. The UE can comprise one or more processors and memory configured to: signal a transceiver of the UE to transmit to the eNodeB a scheduling request (SR), using the selected Rx beam, on a scheduling request (SR) resource in a self-contained subframe according to a time and frequency location of the selected eNodeB Tx beam, as in block 1020. The UE can comprise one or more processors and memory configured to: process (e.g., decode) an advanced physical downlink control channel (xPDCCH), received from the eNodeB, for an uplink (UL) grant using the selected UE RX beam, as in block 1030.

Another example provides functionality 1100 of an eNodeB operable to communicate with a User Equipment (UE), within a wireless communication network, using a scheduling request transmission for a mmWave system, as shown in the flow chart in FIG. 11. The functionality 1100 can be implemented as a method or the functionality can be executed as instructions on a machine, where the instructions are included one or more computer readable mediums or one or more non-transitory machine readable storage mediums. The eNodeB can comprise one or more processors and memory configured to: broadcast a beamforming reference signal (BRS) to enable the UE to select a selected eNodeB transmission (Tx) beam and a selected UE reception (Rx) beam based on the BRS received power (BRS-RP), which can be a BRS-RP having a highest level of received power as compared to other BRS-RP, as in block 1110. The eNodeB can comprise one or more processors and memory configured to: process a scheduling request (SR) on a SR resource in a self-contained subframe, received from the UE, according to a time and frequency location of the selected eNodeB Tx beam, as in block 1120. The eNodeB can comprise one or more processors and memory configured to: generate (encode), for transmission to the UE, an advanced physical downlink control channel (xPDCCH) for an uplink (UL) grant using the selected eNodeB TX beam, as in block 1130.

Figure 12:
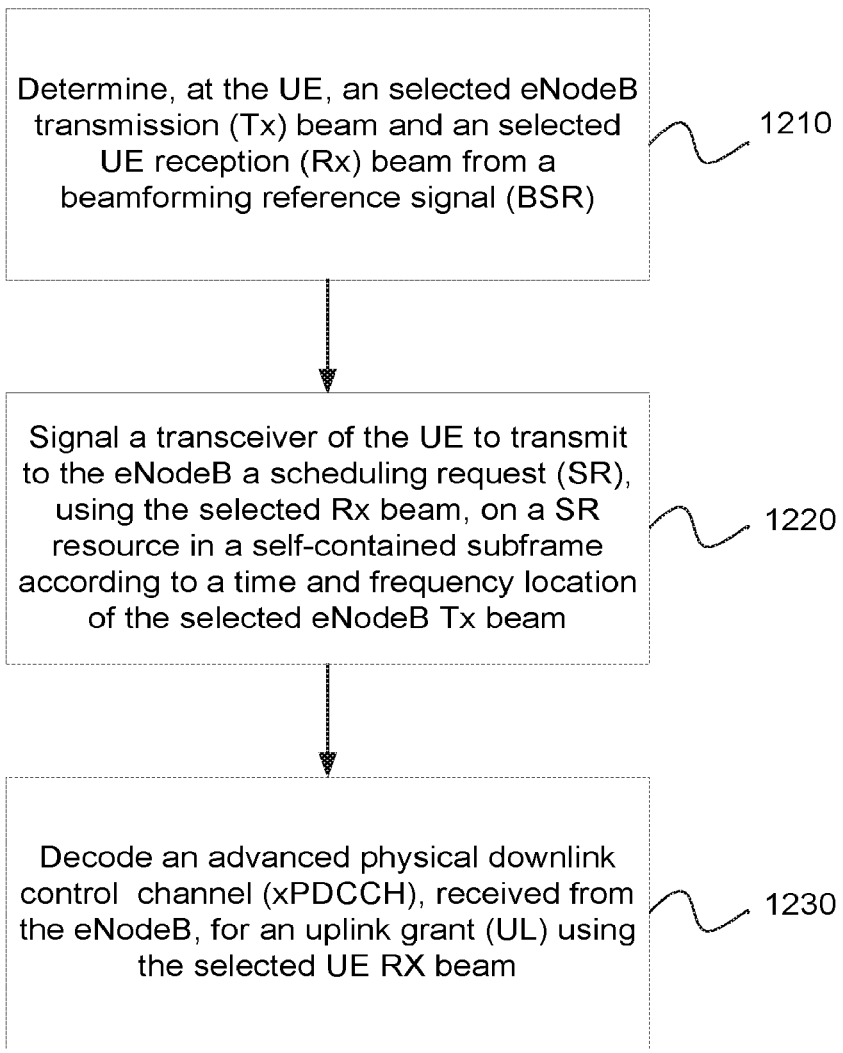
FIG. 12 depicts functionality of a user equipment (UE) to communicate with an eNodeB, within a wireless communication network, for using a scheduling request transmission for a mmWave system in accordance with an example.

Turning now to FIG. 12, an example provides functionality 1200 of a User Equipment (UE) to communicate with an eNodeB, within a wireless communication network, for using a scheduling request transmission for a mmWave system, as shown in the flow chart in FIG. 12. The functionality 1200 can be implemented as a method or the functionality can be executed as instructions on a machine, where the instructions are included one or more computer readable mediums or one or more non-transitory machine readable storage mediums. The UE can comprise one or more processors and memory configured to: determine, at the UE, a selected eNodeB transmission (Tx) beam and a selected UE reception (Rx) beam from a beamforming reference signal (BRS), as in block 1210. The UE can comprise one or more processors and memory configured to: signal a transceiver of the UE to transmit to the eNodeB a scheduling request (SR), using the selected Rx beam, on a SR resource in a self-contained subframe according to a time and frequency location of the selected eNodeB Tx beam, as in block 1220. The UE can comprise one or more processors and memory configured to: process an advanced physical downlink control channel (xPDCCH), received from the eNodeB, for an uplink grant (UL) using the selected UE RX beam, as in block 1230.

Figure 13:
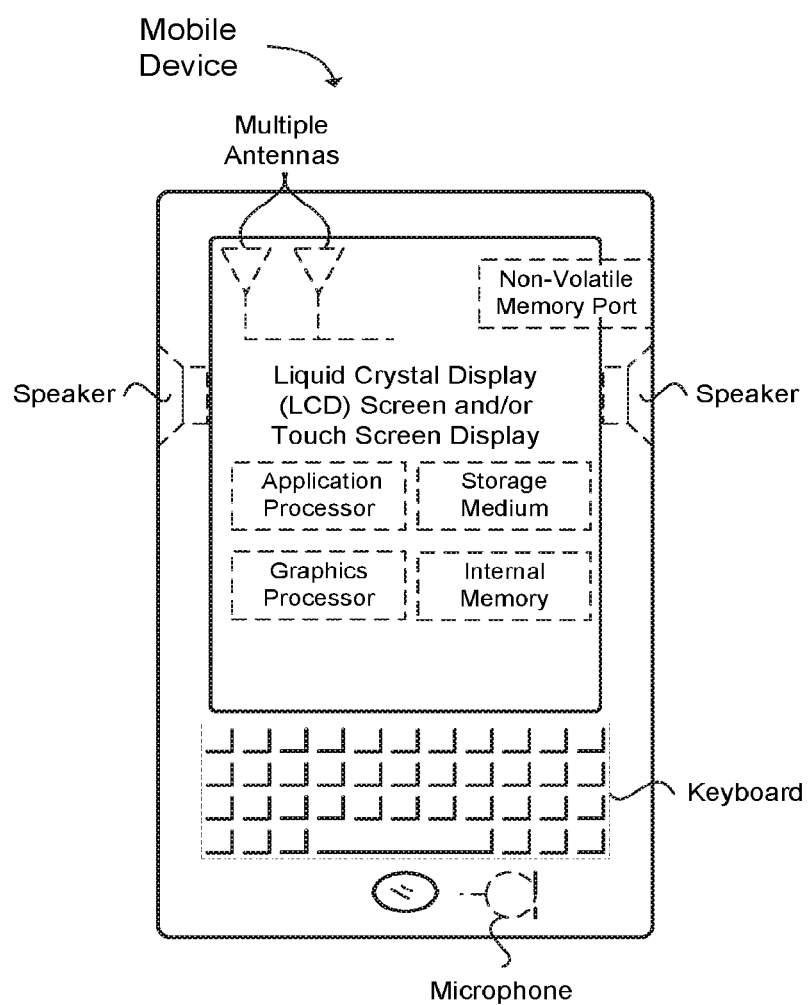
FIG. 13 illustrates a diagram of example components of a wireless device (e.g. User Equipment "UE") device in accordance with an example.

FIG. 13 illustrates a diagram of a wireless device (e.g., UE) in accordance with an example. FIG. 13 provides an example illustration of the wireless device, such as a user equipment (UE) UE, a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communicate with the application processor, the graphics processor, the display, the non-volatile memory port, and/or internal memory. In one aspect, the application processor and graphics processor are storage mediums.

Figure 14:
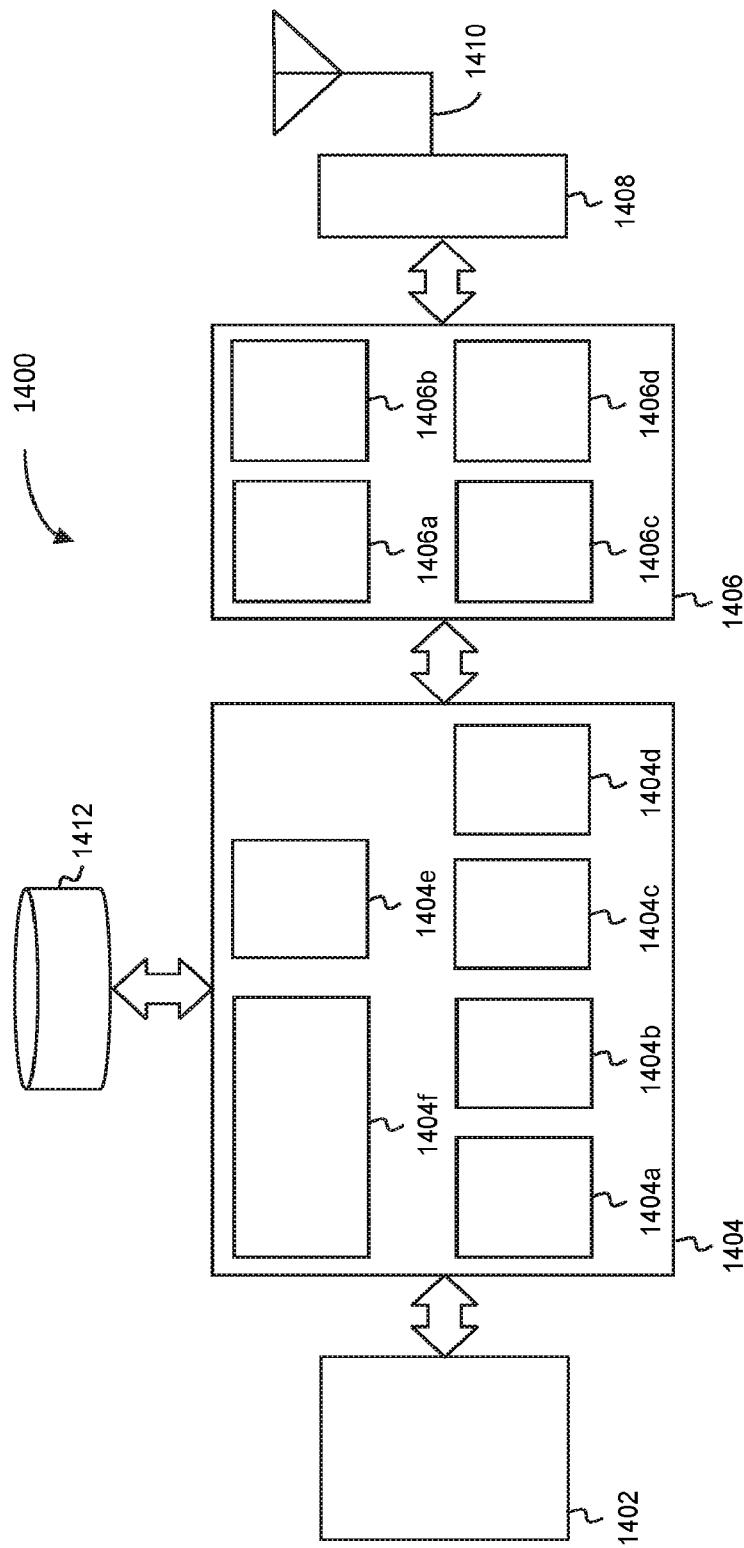
FIG. 14 illustrates a diagram of example components of a User Equipment (UE) device in accordance with an example.

FIG. 14 illustrates a diagram of example components of a User Equipment (UE) device in accordance with an example. FIG. 14 illustrates, for one aspect, example components of a User Equipment (UE) device 1400. In some aspects, the UE device 1400 can include application circuitry 1402, baseband circuitry 1404, Radio Frequency (RF) circuitry 1406, front-end module (FEM) circuitry 1408 and one or more antennas 1410, coupled together at least as shown.

The application circuitry 1402 can include one or more application processors. For example, the application circuitry 1402 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The processor(s) can include any combination of general-purpose processors and dedicated processors (e.g., graphics processors, application processors, etc.). The processors can be coupled with and/or can include a storage medium 1412, and can be configured to execute instructions stored in the storage medium 1412 to enable various applications and/or operating systems to run on the system.

The baseband circuitry 1404 can include circuitry such as, but not limited to, one or more single-core or multi-core processors. The baseband circuitry 1404 can include one or more baseband processors and/or control logic to process baseband signals received from a receive signal path of the RF circuitry 1406 and to generate baseband signals for a transmit signal path of the RF circuitry 1406. Baseband processing circuitry 1404 can interface with the application circuitry 1402 for generation and processing of the baseband signals and for controlling operations of the RF circuitry 1406. For example, in some aspects, the baseband circuitry 1404 can include a second generation (2G) baseband processor 1404a, third generation (3G) baseband processor 1404b, fourth generation (4G) baseband processor 1404c, and/or other baseband processor(s) 1404d for other existing generations, generations in development or to be developed in the future (e.g., fifth generation (5G), 6G, etc.). The baseband circuitry 1404 (e.g., one or more of baseband processors 1404a-d) can handle various radio control functions that enable communication with one or more radio networks via the RF circuitry 1406. The radio control functions can include, but are not limited to, signal modulation/demodulation, encoding/decoding, radio frequency shifting, etc. In some aspects, modulation/demodulation circuitry of the baseband circuitry 1404 can include Fast-Fourier Transform (FFT), precoding, and/or constellation mapping/demapping functionality. In some aspects, encoding/decoding circuitry of the baseband circuitry 1404 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1404 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1404e of the baseband circuitry 1404 can be configured to run elements of the protocol stack for signaling of the PHY, MAC, RLC, PDCP and/or RRC layers. In some aspects, the baseband circuitry can include one or more audio digital signal processor(s) (DSP) 1404f. The audio DSP(s) 1404f can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1404 and the application circuitry 1402 can be implemented together such as, for example, on a system on a chip (SOC).

In some aspects, the baseband circuitry 1404 can provide for communication compatible with one or more radio technologies. For example, in some aspects, the baseband circuitry 1404 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1404 is configured to support radio communications of more than one wireless protocol can be referred to as multi-mode baseband circuitry.

RF circuitry 1406 can enable communication with wireless networks using modulated electromagnetic radiation through a non-solid medium. In various aspects, the RF circuitry 1406 can include switches, filters, amplifiers, etc. to facilitate the communication with the wireless network. RF circuitry 1406 can include a receive signal path which can include circuitry to down-convert RF signals received from the FEM circuitry 1408 and provide baseband signals to the baseband circuitry 1404. RF circuitry 1406 can also include a transmit signal path which can include circuitry to up-convert baseband signals provided by the baseband circuitry 1404 and provide RF output signals to the FEM circuitry 1408 for transmission.

In some aspects, the RF circuitry 1406 can include a receive signal path and a transmit signal path. The receive signal path of the RF circuitry 1406 can include mixer circuitry 1406a, amplifier circuitry 1406b and filter circuitry 1406c. The transmit signal path of the RF circuitry 1406 can include filter circuitry 1406*c* and mixer circuitry 1406*a*. RF circuitry 1406 can also include synthesizer circuitry 1406*d* for synthesizing a frequency for use by the mixer circuitry 1406*a* of the receive signal path and the transmit signal path. In some aspects, the mixer circuitry 1406*a* of the receive signal path can be configured to down-convert RF signals received from the FEM circuitry 1408 based on the synthesized frequency provided by synthesizer circuitry 1406*d*. The amplifier circuitry 1406*b* can be configured to amplify the down-converted signals and the filter circuitry 1406*c* can be a low-pass filter (LPF) or band-pass filter (BPF) configured to remove unwanted signals from the down-converted signals to generate output baseband signals. Output baseband signals can be provided to the baseband circuitry 1404 for further processing. In some aspects, the output baseband signals can be zero-frequency baseband signals, although the output baseband signals do not have to be zero-frequency baseband signals. In some aspects, mixer circuitry 1406*a* of the receive signal path can comprise passive mixers, although the scope of the aspects is not limited in this respect.

In some aspects, the mixer circuitry 1406*a* of the transmit signal path can be configured to up-convert input baseband signals based on the synthesized frequency provided by the synthesizer circuitry 1406*d* to generate RF output signals for the FEM circuitry 1408. The baseband signals can be provided by the baseband circuitry 1404 and can be filtered by filter circuitry 1406*c*. The filter circuitry 1406*c* can include a low-pass filter (LPF), although the scope of the aspects is not limited in this respect.

In some aspects, the mixer circuitry 1406*a* of the receive signal path and the mixer circuitry 1406*a* of the transmit signal path can include two or more mixers and can be arranged for quadrature downconversion and/or upconversion respectively. In some aspects, the mixer circuitry 1406*a* of the receive signal path and the mixer circuitry 1406*a* of the transmit signal path can include two or more mixers and can be arranged for image rejection (e.g., Hartley image rejection). In some aspects, the mixer circuitry 1406*a* of the receive signal path and the mixer circuitry 1406*a* can be arranged for direct downconversion and/or direct upconversion, respectively. In some aspects, the mixer circuitry 1406*a* of the receive signal path and the mixer circuitry 1406*a* of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1406 can include analog-to-digital converter (ADC) and digital-to-analog converter (DAC) circuitry and the baseband circuitry 1404 can include a digital baseband interface to communicate with the RF circuitry 1406.

In some dual-mode embodiments, a separate radio IC circuitry can be provided for processing signals for each spectrum, although the scope of the embodiments is not limited in this respect.

In some embodiments, the synthesizer circuitry 1406*d* can be a fractional-N synthesizer or a fractional N/N+1 synthesizer, although the scope of the embodiments is not limited in this respect as other types of frequency synthesizers can be suitable. For example, synthesizer circuitry 1406*d* can be a delta-sigma synthesizer, a frequency multiplier, or a synthesizer comprising a phase-locked loop with a frequency divider.

The synthesizer circuitry 1406*d* can be configured to synthesize an output frequency for use by the mixer circuitry 1406*a* of the RF circuitry 1406 based on a frequency input and a divider control input. In some embodiments, the synthesizer circuitry 1406*d* can be a fractional N/N+1 synthesizer.

In some embodiments, frequency input can be provided by a voltage controlled oscillator (VCO), although that is not a constraint. Divider control input can be provided by either the baseband circuitry 1404 or the applications processor 1402 depending on the desired output frequency. In some embodiments, a divider control input (e.g., N) can be determined from a look-up table based on a channel indicated by the applications processor 1402.

Synthesizer circuitry 1406*d* of the RF circuitry 1406 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406*d* can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a local oscillator (LO) frequency. In some embodiments, the RF circuitry 1406 can include an IQ/polar converter.

FEM circuitry 1408 can include a receive signal path which can include circuitry configured to operate on RF signals received from one or more antennas 1410, amplify the received signals and provide the amplified versions of the received signals to the RF circuitry 1406 for further processing. FEM circuitry 1408 can also include a transmit signal path which can include circuitry configured to amplify signals for transmission provided by the RF circuitry 1406 for transmission by one or more of the one or more antennas 1410.

In some embodiments, the FEM circuitry 1408 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1406). The transmit signal path of the FEM circuitry 1408 can include a power amplifier (PA) to amplify input RF signals (e.g., provided by RF circuitry 1406), and one or more filters to generate RF signals for subsequent transmission (e.g., by one or more of the one or more antennas 1410.

In some embodiments, the UE device 1400 can include additional elements such as, for example, memory/storage, display, camera, sensor, and/or input/output (I/O) interface.

Figure 15:
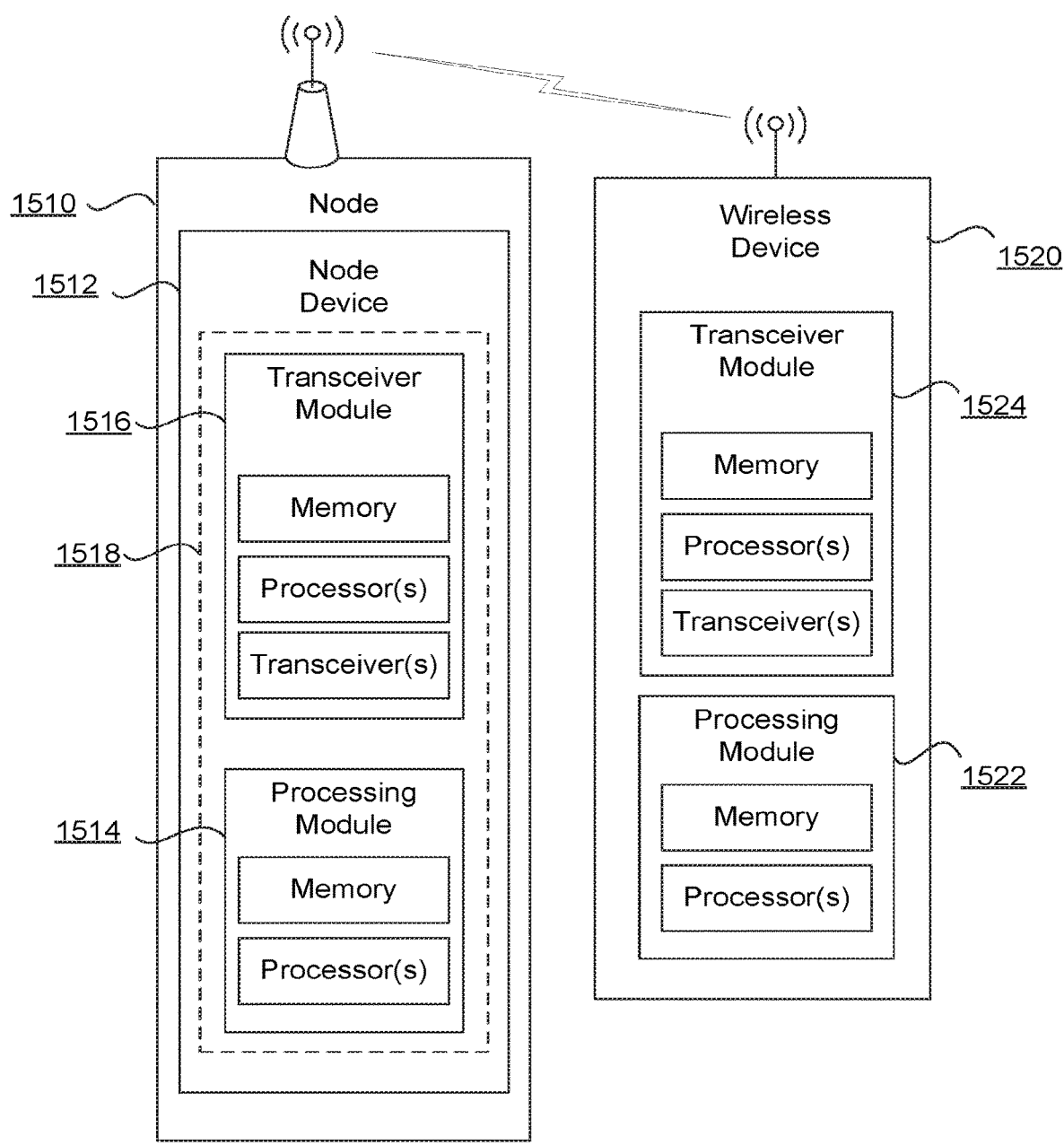
FIG. 15 illustrates a diagram of a node (e.g., eNB) and wireless device (e.g., UE) in accordance with an example.

FIG. 15 illustrates a diagram 1500 of a node 1510 (e.g., eNB and/or a base station) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1510 can include a node device 1512. The node device 1512 or the node 1510 can be configured to communicate with the wireless device 1520. The node device 1512 can be configured to implement the technology described. The node device 1512 can include a processing module 1514 and a transceiver module 1516. In one aspect, the node device 1512 can include the transceiver module 1516 and the processing module 1514 forming a circuitry 1518 for the node 1510. In one aspect, the transceiver module 1516 and the processing module 1514 can form a circuitry of the node device 1512. The processing module 1514 can include one or more processors and memory. In one embodiment, the processing module 1522 can include one or more application processors. The transceiver module 1516 can include a transceiver and one or more processors and memory. In one embodiment, the transceiver module 1516 can include a baseband processor.

The wireless device 1520 can include a transceiver module 1524 and a processing module 1522. The processing module 1522 can include one or more processors and memory. In one embodiment, the processing module 1522 can include one or more application processors. The transceiver module 1524 can include a transceiver and one or more processors and memory. In one embodiment, the transceiver module 1524 can include a baseband processor. The wireless device 1520 can be configured to implement the technology described. The node 1510 and the wireless devices 1520 can also include one or more storage mediums, such as the transceiver module 1516, 1524 and/or the processing module 1514, 1522. In one aspect, the components described herein of the transceiver module 1516 can be included in one or more separate devices that can be used in a cloud-RAN (C-RAN) environment.

EXAMPLES

The following examples pertain to specific embodiments and point out specific features, elements, or steps that can be used or otherwise combined in achieving such embodiments.

Example 1 includes apparatus of a User Equipment (UE), the UE configured to communicate with an eNodeB, the apparatus comprising one or more processors and memory configured to: select, at the UE, a selected eNodeB transmission (Tx) beam and a selected UE reception (Rx) beam based on a beamforming reference signal (BRS) received power (BRS-RP); signal a transceiver of the UE to transmit to the eNodeB a scheduling request (SR), using the selected Rx beam, on a scheduling request (SR) resource in a self-contained subframe according to a time and frequency location of the selected eNodeB Tx beam; and decode an advanced physical downlink control channel (xPDCCH), received from the eNodeB, for an uplink (UL) grant using the selected UE RX beam.

Example 2 includes the apparatus of example 1, wherein the SR resource in a frequency domain is configured by higher layers via an advanced master information block (xMIB), an advanced system information block (xSIB), or using radio resource control (RRC) signaling, and the selected Tx beam and the selected RX beam are selected based on the BRS-RP measurement for a plurality of selected UE RX beams received at the UE.

Example 3 includes the apparatus of example 1 or 2, wherein the SR resource in the self-contained subframe comprises an advanced physical downlink control channel (xPDCCH), a guard period (GP), one or more additional SR resources, and an advanced physical uplink control channel (xPUCCH), wherein the xPDCCH and the guard period are located within the UL self-contained subframe prior to the SR resource, the one or more additional SR resources, and the xPUCCH, wherein the xPUCCH is located after the SR resource and the one or more additional SR resources.

Example 4 includes the apparatus of example 1 or 2, wherein the SR resource in the self-contained subframe comprises an advanced physical downlink control channel (xPDCCH), a guard period (GP), one or more additional SR resources, wherein the xPDCCH and the guard period are located within the self-contained subframe prior to the SR resource and the one or more additional SR resources.

Example 5 includes the apparatus of example 1, wherein the one or more processors and memory are further configured to define a one-to-one association between the SR resource and a BRS antenna port (AP).

Example 6 includes the apparatus of example 1 or 5, wherein the one or more processors and memory are further configured to: define a one-to-one association between the SR resource and a BRS antenna port (AP) according to a time domain or a frequency domain; and signal a transceiver of the UE to transmit to the eNodeB the SR using a dedicated resource index that is configured by higher layers via a UE specific RRC signalling; wherein the UE selects a time and frequency SR resource for transmission of the SR that has a one-to-one association on the time and frequency SR resource where the selected eNodeB Tx beam is located.

Example 7 includes the apparatus of example 1 or 6, wherein the dedicated resource index for transmission of the SR is a cyclic shift index, a comb index, or a combination of thereof.

Example 8 includes the apparatus of example 1 or 6, wherein the one or more processors and memory are further configured to: define a one-to-one association between the SR resource and the BRS AP according to a time and code domain, wherein the UE is configured with K SR resource index, where K is a total number of BRS APs; and select a time and code SR resource for transmission of the SR that has the one-to-one association on the time and frequency SR resource where the selected eNodeB Tx beam is located.

Example 9 includes the apparatus of example 8, wherein the one or more processors and memory are further configured to: define a one-to-one association between the SR resource and the BRS AP according to a time, frequency, or code domain, wherein the UE is configured with $M_0$ SR resource indexes, where $M_0$ is less than K; and configure $M_1$ SR frequency resources by higher layers, where $M_0$ multiplied by $M_1$ is equal to K according to an equation $M_0 \cdot M_1 = K$, wherein M0 and M1 are positive integers; and select a time SR resource, a frequency SR resource, or a code SR resource for transmission of the SR that has the one-to-one association of the time and frequency SR resource where the selected eNodeB Tx beam is located.

Example 10 includes the apparatus of example 9, wherein the one or more processors and memory are further configured to signal a transceiver of the UE to simultaneously transmit to the eNodeB the SR on N SR resources, where N is a positive integer, and N is predefined or configured by an advanced master information block (xMIB), an advanced system information block (xSIB), or radio resource control (RRC) signaling; wherein N SR transmissions correspond to N selected eNodeB Tx beams.

Example 11 includes the apparatus of example 10, wherein the one or more processors and memory are further configured to: define L SR resources, where L is greater than K, and K is a number of BRS APs; define a one-to-many resource association between the BRS APs and the SR resource in a time and frequency domain; and randomly select one SR frequency resource to transmit the SR according to the one-to-many resource association between the BRS AP and the SR resource.

Example 12 includes the apparatus of example 1, wherein the UE includes at least one of an antenna, a touch sensitive display screen, a speaker, a microphone, a graphics processor, an application processor, a baseband processor, an internal memory, a non-volatile memory port, and combinations thereof.

Example 13 include an apparatus of an eNodeB, the eNodeB configured to communicate with an User Equipment (UE), the apparatus comprising one or more processors and memory configured to: broadcast a beamforming reference signal (BRS) to enable the UE to select a selected eNodeB transmission (Tx) beam and a selected UE reception (Rx) beam based on a BRS received power (BRS-RP); process a scheduling request (SR) on a SR resource in a self-contained subframe, received from the UE, according to a time and frequency location of the selected eNodeB Tx beam; and encode, for transmission to the UE, an advanced physical downlink control channel (xPDCCH) for an uplink (UL) grant using the selected eNodeB TX beam.

Example 14 includes the apparatus of example 13, wherein the SR resource in a frequency domain is configured by higher layers via an advanced master information block (xMIB), an advanced system information block (xSIB), or using radio resource control (RRC) signaling.

Example 15 includes the apparatus of example 13, wherein the SR resource in the self-contained subframe comprises an advanced physical downlink control channel (xPDCCH), a guard period (GP), one or more additional SR resources, and an advanced physical uplink control channel (xPUCCH), wherein the xPDCCH and the guard period are located within the UL self-contained subframe prior to the SR resource, the one or more additional SR resources, and the xPUCCH, wherein the xPUCCH is located after the SR resource and the one or more additional SR resources.

Example 16 includes the apparatus of example 13, wherein the SR resource in the self-contained subframe comprises an advanced physical downlink control channel (xPDCCH), a guard period (GP), one or more additional SR resources, or a combination thereof, wherein the xPDCCH and the guard period are located within the self-contained subframe prior to the SR resource and the one or more additional SR resources.

Example 17 includes the apparatus of example 13 or 16, wherein the one or more processors and memory are further configured to predefine or configure a subframe gap between a transmission of the BRS and a corresponding transmission of the SR resource by higher layers via an advanced master information block (xMIB), an advanced system information block (xSIB), or radio resource control (RRC) signalling.

Example 18 includes the apparatus of example 17, wherein the one or more processors and memory are further configured to process a time and frequency SR, received from the UE, using a dedicated resource index that is configured by higher layers via a UE specific RRC signalling; wherein the time and frequency SR resource is selected by the UE for transmission of the SR to the eNodeB that has a one-to-one association on the time and frequency SR resource where the selected eNodeB Tx beam is located, wherein the dedicated resource index for transmission of the SR is a cyclic shift index, a comb index, or a combination of thereof.

Example 19 includes the apparatus of example 13 or 18, wherein the one or more processors and memory are further configured to process a time and code SR resource, received by the UE, that has the one-to-one association on the time and frequency SR resource where the selected eNodeB Tx beam is located, wherein a one-to-one association is defined between the SR resource and the BRS AP according to a time and code domain.

Example 20 includes the apparatus of example 19, wherein the one or more processors and memory are further configured to: process a time, frequency, and code SR resource, received from a UE, that has a one-to-one association on the time and frequency SR resource where the selected eNodeB Tx beam is located.

Example 21 includes the apparatus of example 20, wherein the one or more processors and memory are further configured to process the SR on N SR resources, received by the UE, where N is a positive integer, and N is predefined or configured by an advanced master information block (xMIB), an advanced system information block (xSIB), or radio resource control (RRC) signalling; wherein N SR transmissions correspond to N selected eNodeB Tx beams.

Example 22 includes the apparatus of example 13 or 21, wherein the one or more processors and memory are further configured to process a randomly selected SR frequency resource, received from the UE according to a one-to-many resource association between the BRS AP and the SR resource.

Example 23 includes at least one machine readable storage medium having instructions embodied thereon for a User Equipment (UE) to communicate with an eNodeB, the instructions when executed cause the UE to: determine, at the UE, a selected eNodeB transmission (Tx) beam and a selected UE reception (Rx) beam from a beamforming reference signal (BRS) received power (BRS-RP); signal a transceiver of the UE to transmit to the eNodeB a scheduling request (SR), using the selected Rx beam, on a SR resource in a self-contained subframe according to a time and frequency location of the selected eNodeB Tx beam; and decode an advanced physical downlink control channel (xPDCCH), received from the eNodeB, for an uplink grant (UL) using the selected UE RX beam.

Example 24 includes the at least one machine readable storage medium of example 23, wherein the SR resource in a frequency domain is configured by higher layers via an advanced master information block (xMIB), an advanced system information block (xSIB), or using radio resource control (RRC) signaling.

Example 25 includes the at least one machine readable storage medium of example 23 or 24, wherein the SR resource in the self-contained subframe comprises an advanced physical downlink control channel (xPDCCH), a guard period (GP), one or more additional SR resources, and an advanced physical uplink control channel (xPUCCH), wherein the xPDCCH, the guard period are located within the UL self-contained subframe prior to the SR resource, the one or more additional SR resources, and the xPUCCH, wherein the xPUCCH is located after the SR resource and the one or more additional SR resources, or comprises an advanced physical downlink control channel (xPDCCH), a guard period (GP), one or more additional SR resources, wherein the xPDCCH and the guard period are located within the self-contained subframe prior to the SR resource and the one or more additional SR resources, or the SR occupies at least fourteen orthogonal frequency-division multiplexing (OFDM) symbols of the self-contained subframe.

Example 26 includes the at least one machine readable storage medium of example 25, further comprising instructions which when executed cause the UE to: define a one-to-one association between the SR resource and a BRS antenna port (AP); predefine or configure a subframe gap between transmission of the BRS and a corresponding transmission of the SR resource by higher layers via an advanced master information block (xMIB), an advanced system information block (xSIB), or radio resource control (RRC) signalling; define a one-to-one association between the SR resource and a BRS antenna port (AP) according to a time domain or a frequency domain; signal a transceiver of the UE to transmit to the eNodeB the SR using a dedicated resource index that is configured by higher layers via a UE specific RRC signalling; wherein the UE selects a time and frequency SR resource for transmission of the SR that has a one-to-one association on the time and frequency SR resource where the advance selected eNodeB Tx beam is located, wherein the dedicated resource index for transmission of the SR is a cyclic shift index, a comb index, or a combination of thereof; define a one-to-one association between the SR resource and the BRS AP according to a time and code domain, wherein the UE is configured with K SR resource index, where K is a total number of BRS APs; or select a time and code SR resource for transmission of the SR that has the one-to-one association on the time and frequency SR resource where the selected eNodeB Tx beam is located.

Example 27 includes the at least one machine readable storage medium of example 26 further comprising instructions which when executed cause the UE to: define a one-to-one association between the SR resource and the BRS AP according to a time, frequency, and code domain, wherein UE is configured with $M_0$ SR resource indexes, where $M_0$ is less than K; configure $M_1$ SR frequency resources by higher layers, where is $M_0$ multiplied by $M_1$ is equal to K according to equation $M_0 \cdot M_1 = K$; select a time, frequency, and code SR resource for transmission of the SR that has the one-to-one association on the time and frequency SR resource where the selected eNodeB Tx beam is located; or signal a transceiver of the UE to simultaneously transmit to the eNodeB the SR on N SR resources, where N is a positive integer, and N is predefined or configured by an advanced master information block (xMIB), an advanced system information block (xSIB), or radio resource control (RRC) signalling; wherein N SR transmissions correspond to N selected eNodeB Tx beams.

Example 28 includes the at least one machine readable storage medium of example 23 or 27, further comprising instructions which when executed cause the UE to: define L SR resource, where L is greater than K, and K is a number of BRS APs; define a one-to-many resource association between the BRS AP and the SR resource in a time and frequency domain; and randomly select one SR frequency resource to transmit the SR according to the one-to-many resource association between the BRS AP and the SR resource.

Example 29 includes an apparatus of a User Equipment (UE), the UE configured to communicate with an eNodeB, the apparatus comprising one or more processors and memory configured to: select, at the UE, a selected eNodeB transmission (Tx) beam and a selected UE reception (Rx) beam based on a beamforming reference signal (BRS) received power (BRS-RP); signal a transceiver of the UE to transmit to the eNodeB a scheduling request (SR), using the selected Rx beam, on a scheduling request (SR) resource in a self-contained subframe according to a time and frequency location of the selected eNodeB Tx beam; and decode an advanced physical downlink control channel (xPDCCH), received from the eNodeB, for an uplink (UL) grant using the selected UE RX beam.

Example 30 includes the apparatus of example 29, wherein the SR resource in a frequency domain is configured by higher layers via an advanced master information block (xMIB), an advanced system information block (xSIB), or using radio resource control (RRC) signaling, and the selected Tx beam and the selected RX beam are selected based on the BRS-RP measurement for a plurality of selected UE RX beams received at the UE.

Example 31 includes the apparatus of example 30, wherein the SR resource in the self-contained subframe comprises an advanced physical downlink control channel (xPDCCH), a guard period (GP), one or more additional SR resources, and an advanced physical uplink control channel (xPUCCH), wherein the xPDCCH and the guard period are located within the UL self-contained subframe prior to the SR resource, the one or more additional SR resources, and the xPUCCH, wherein the xPUCCH is located after the SR resource and the one or more additional SR resources.

Example 32 includes the apparatus of example 30, wherein the SR resource in the self-contained subframe comprises an advanced physical downlink control channel (xPDCCH), a guard period (GP), one or more additional SR resources, wherein the xPDCCH and the guard period are located within the self-contained subframe prior to the SR resource and the one or more additional SR resources.

Example 33 includes the apparatus of example 30, wherein the one or more processors and memory are further configured to define a one-to-one association between the SR resource and a BRS antenna port (AP).

Example 34 includes the apparatus of example 33, wherein the one or more processors and memory are further configured to: define a one-to-one association between the SR resource and a BRS antenna port (AP) according to a time domain or a frequency domain; and signal a transceiver of the UE to transmit to the eNodeB the SR using a dedicated resource index that is configured by higher layers via a UE specific RRC signalling; wherein the UE selects a time and frequency SR resource for transmission of the SR that has a one-to-one association on the time and frequency SR resource where the selected eNodeB Tx beam is located.

Example 35 includes the apparatus of example 34, wherein the dedicated resource index for transmission of the SR is a cyclic shift index, a comb index, or a combination of thereof.

Example 36 includes the apparatus of example 35, wherein the one or more processors and memory are further configured to: define a one-to-one association between the SR resource and the BRS AP according to a time and code domain, wherein the UE is configured with K SR resource index, where K is a total number of BRS APs; and select a time and code SR resource for transmission of the SR that has the one-to-one association on the time and frequency SR resource where the selected eNodeB Tx beam is located.

Example 37 includes the apparatus of example 36, wherein the one or more processors and memory are further configured to: define a one-to-one association between the SR resource and the BRS AP according to a time, frequency, or code domain, wherein the UE is configured with $M_0$ SR resource indexes, where $M_0$ is less than K; configure $M_1$ SR frequency resources by higher layers, where $M_0$ multiplied by $M_1$ is equal to K according to an equation $M_0 \cdot M_1 = K$, wherein M0 and M1 are positive integers; and select a time SR resource, a frequency SR resource, or a code SR resource for transmission of the SR that has the one-to-one association of the time and frequency SR resource where the selected eNodeB Tx beam is located.

Example 38 includes the apparatus of example 37, wherein the one or more processors and memory are further configured to signal a transceiver of the UE to simultaneously transmit to the eNodeB the SR on N SR resources, where N is a positive integer, and N is predefined or configured by an advanced master information block (xMIB), an advanced system information block (xSIB), or radio resource control (RRC) signaling; wherein N SR transmissions correspond to N selected eNodeB Tx beams.

Example 39 includes the apparatus of example 38, wherein the one or more processors and memory are further configured to: define L SR resources, where L is greater than K, and K is a number of BRS APs; define a one-to-many resource association between the BRS APs and the SR resource in a time and frequency domain; and randomly select one SR frequency resource to transmit the SR according to the one-to-many resource association between the BRS AP and the SR resource.

Example 40 includes the apparatus of example 29, wherein the UE includes at least one of an antenna, a touch sensitive display screen, a speaker, a microphone, a graphics processor, an application processor, a baseband processor, an internal memory, a non-volatile memory port, and combinations thereof.

Example 41 includes an apparatus of an eNodeB, the eNodeB configured to communicate with an User Equipment (UE), the apparatus comprising one or more processors and memory configured to: broadcast a beamforming reference signal (BRS) to enable the UE to select a selected eNodeB transmission (Tx) beam and a selected UE reception (Rx) beam based on a BRS received power (BRS-RP); process a scheduling request (SR) on a SR resource in a self-contained subframe, received from the UE, according to a time and frequency location of the selected eNodeB Tx beam; and encode, for transmission to the UE, an advanced physical downlink control channel (xPDCCH) for an uplink (UL) grant using the selected eNodeB TX beam.

Example 42 includes the apparatus of example 41, wherein the SR resource in a frequency domain is configured by higher layers via an advanced master information block (xMIB), an advanced system information block (xSIB), or using radio resource control (RRC) signaling.

Example 43 includes the apparatus of example 41, wherein the SR resource in the self-contained subframe comprises an advanced physical downlink control channel (xPDCCH), a guard period (GP), one or more additional SR resources, and an advanced physical uplink control channel (xPUCCH), wherein the xPDCCH and the guard period are located within the UL self-contained subframe prior to the SR resource, the one or more additional SR resources, and the xPUCCH, wherein the xPUCCH is located after the SR resource and the one or more additional SR resources.

Example 44 includes the apparatus of example 41, wherein the SR resource in the self-contained subframe comprises an advanced physical downlink control channel (xPDCCH), a guard period (GP), one or more additional SR resources, or a combination thereof, wherein the xPDCCH and the guard period are located within the self-contained subframe prior to the SR resource and the one or more additional SR resources.

Example 45 includes the apparatus of example 44, wherein the one or more processors and memory are further configured to predefine or configure a subframe gap between a transmission of the BRS and a corresponding transmission of the SR resource by higher layers via an advanced master information block (xMIB), an advanced system information block (xSIB), or radio resource control (RRC) signalling.

Example 46 includes the apparatus of example 45, wherein the one or more processors and memory are further configured to process a time and frequency SR, received from the UE, using a dedicated resource index that is configured by higher layers via a UE specific RRC signalling; wherein the time and frequency SR resource is selected by the UE for transmission of the SR to the eNodeB that has a one-to-one association on the time and frequency SR resource where the selected eNodeB Tx beam is located, wherein the dedicated resource index for transmission of the SR is a cyclic shift index, a comb index, or a combination of thereof.

Example 47 includes the apparatus of example 46, wherein the one or more processors and memory are further configured to process a time and code SR resource, received by the UE, that has the one-to-one association on the time and frequency SR resource where the selected eNodeB Tx beam is located, wherein a one-to-one association is defined between the SR resource and the BRS AP according to a time and code domain.

Example 48 includes the apparatus of example 47, wherein the one or more processors and memory are further configured to: process a time, frequency, and code SR resource, received from a UE, that has a one-to-one association on the time and frequency SR resource where the selected eNodeB Tx beam is located.

Example 49 includes the apparatus of example 48, wherein the one or more processors and memory are further configured to process the SR on N SR resources, received by the UE, where N is a positive integer, and N is predefined or configured by an advanced master information block (xMIB), an advanced system information block (xSIB), or radio resource control (RRC) signalling; wherein N SR transmissions correspond to N selected eNodeB Tx beams.

Example 50 includes the apparatus of example 49, wherein the one or more processors and memory are further configured to process a randomly selected SR frequency resource, received from the UE according to a one-to-many resource association between the BRS AP and the SR resource.

Example 51 includes at least one machine readable storage medium having instructions embodied thereon for a User Equipment (UE) to communicate with an eNodeB, the instructions when executed cause the UE to: determine, at the UE, a selected eNodeB transmission (Tx) beam and a selected UE reception (Rx) beam from a beamforming reference signal (BRS) received power (BRS-RP); signal a transceiver of the UE to transmit to the eNodeB a scheduling request (SR), using the selected Rx beam, on a SR resource in a self-contained subframe according to a time and frequency location of the selected eNodeB Tx beam; and decode an advanced physical downlink control channel (xPDCCH), received from the eNodeB, for an uplink grant (UL) using the selected UE RX beam.

Example 52 includes the at least one machine readable storage medium of example 51, wherein the SR resource in a frequency domain is configured by higher layers via an advanced master information block (xMIB), an advanced system information block (xSIB), or using radio resource control (RRC) signaling.

Example 53 includes the at least one machine readable storage medium of example 52, wherein the SR resource in the self-contained subframe comprises an advanced physical downlink control channel (xPDCCH), a guard period (GP), one or more additional SR resources, and an advanced physical uplink control channel (xPUCCH), wherein the xPDCCH, the guard period are located within the UL self-contained subframe prior to the SR resource, the one or more additional SR resources, and the xPUCCH, wherein the xPUCCH is located after the SR resource and the one or more additional SR resources, or comprises an advanced physical downlink control channel (xPDCCH), a guard period (GP), one or more additional SR resources, wherein the xPDCCH and the guard period are located within the self-contained subframe prior to the SR resource and the one or more additional SR resources, or the SR occupies at least fourteen orthogonal frequency-division multiplexing (OFDM) symbols of the self-contained subframe.

Example 54 includes the at least one machine readable storage medium of example 53, further comprising instructions which when executed cause the UE to: define a one-to-one association between the SR resource and a BRS antenna port (AP); predefine or configure a subframe gap between transmission of the BRS and a corresponding transmission of the SR resource by higher layers via an advanced master information block (xMIB), an advanced system information block (xSIB), or radio resource control (RRC) signalling; define a one-to-one association between the SR resource and a BRS antenna port (AP) according to a time domain or a frequency domain; signal a transceiver of the UE to transmit to the eNodeB the SR using a dedicated resource index that is configured by higher layers via a UE specific RRC signalling; wherein the UE selects a time and frequency SR resource for transmission of the SR that has a one-to-one association on the time and frequency SR resource where the advance selected eNodeB Tx beam is located, wherein the dedicated resource index for transmission of the SR is a cyclic shift index, a comb index, or a combination of thereof; define a one-to-one association between the SR resource and the BRS AP according to a time and code domain, wherein the UE is configured with K SR resource index, where K is a total number of BRS APs; or select a time and code SR resource for transmission of the SR that has the one-to-one association on the time and frequency SR resource where the selected eNodeB Tx beam is located.

Example 55 includes the at least one machine readable storage medium of example 54 further comprising instructions which when executed cause the UE to: define a one-to-one association between the SR resource and the BRS AP according to a time, frequency, and code domain, wherein UE is configured with $M_0$ SR resource indexes, where $M_0$ is less than K; configure $M_1$ SR frequency resources by higher layers, where is $M_0$ multiplied by $M_1$ is equal to K according to equation $M_0 \cdot M_1 = K$; select a time, frequency, and code SR resource for transmission of the SR that has the one-to-one association on the time and frequency SR resource where the selected eNodeB Tx beam is located; or signal a transceiver of the UE to simultaneously transmit to the eNodeB the SR on N SR resources, where N is a positive integer, and N is predefined or configured by an advanced master information block (xMIB), an advanced system information block (xSIB), or radio resource control (RRC) signalling; wherein N SR transmissions correspond to N selected eNodeB Tx beams.

Example 56 includes the at least one machine readable storage medium of example 55, further comprising instructions which when executed cause the UE to: define L SR resource, where L is greater than K, and K is a number of BRS APs; define a one-to-many resource association between the BRS AP and the SR resource in a time and frequency domain; and randomly select one SR frequency resource to transmit the SR according to the one-to-many resource association between the BRS AP and the SR resource.

Example 57 includes an apparatus of a User Equipment (UE), the UE configured to communicate with an eNodeB, the apparatus comprising one or more processors and memory configured to: select, at the UE, a selected eNodeB transmission (Tx) beam and a selected UE reception (Rx) beam based on a beamforming reference signal (BRS) received power (BRS-RP); signal a transceiver of the UE to transmit to the eNodeB a scheduling request (SR), using the selected Rx beam, on a scheduling request (SR) resource in a self-contained subframe according to a time and frequency location of the selected eNodeB Tx beam; and decode an advanced physical downlink control channel (xPDCCH), received from the eNodeB, for an uplink (UL) grant using the selected UE RX beam.

Example 58 includes the apparatus of example 57, wherein the SR resource in a frequency domain is configured by higher layers via an advanced master information block (xMIB), an advanced system information block (xSIB), or using radio resource control (RRC) signaling, and the selected Tx beam and the selected RX beam are selected based on the BRS-RP measurement for a plurality of selected UE RX beams received at the UE, or wherein the SR resource in the self-contained subframe comprises an advanced physical downlink control channel (xPDCCH), a guard period (GP), one or more additional SR resources, and an advanced physical uplink control channel (xPUCCH), wherein the xPDCCH and the guard period are located within the UL self-contained subframe prior to the SR resource, the one or more additional SR resources, and the xPUCCH, wherein the xPUCCH is located after the SR resource and the one or more additional SR resources, or wherein the SR resource in the self-contained subframe comprises an advanced physical downlink control channel (xPDCCH), a guard period (GP), one or more additional SR resources, wherein the xPDCCH and the guard period are located within the self-contained subframe prior to the SR resource and the one or more additional SR resources.

Example 59 includes the apparatus of example 57 or 58, wherein the one or more processors and memory are further configured to define a one-to-one association between the SR resource and a BRS antenna port (AP).

In example 60, the subject matter of example 57 or any of the examples described herein may further include, wherein the one or more processors and memory are further configured to: define a one-to-one association between the SR resource and a BRS antenna port (AP) according to a time domain or a frequency domain; and signal a transceiver of the UE to transmit to the eNodeB the SR using a dedicated resource index that is configured by higher layers via a UE specific RRC signalling; wherein the UE selects a time and frequency SR resource for transmission of the SR that has a one-to-one association on the time and frequency SR resource where the selected eNodeB Tx beam is located, or wherein the dedicated resource index for transmission of the SR is a cyclic shift index, a comb index, or a combination of thereof.

In example 61, the subject matter of example 57 or any of the examples described herein may further include, wherein the one or more processors and memory are further configured to: define a one-to-one association between the SR resource and the BRS AP according to a time and code domain, wherein the UE is configured with K SR resource index, where K is a total number of BRS APs; and select a time and code SR resource for transmission of the SR that has the one-to-one association on the time and frequency SR resource where the selected eNodeB Tx beam is located; define a one-to-one association between the SR resource and the BRS AP according to a time, frequency, or code domain, wherein the UE is configured with $M_0$ SR resource indexes, where $M_0$ is less than K; configure $M_1$ SR frequency resources by higher layers, where $M_0$ multiplied by $M_1$ is equal to K according to an equation $M_0 \cdot M_1 = K$, wherein M0 and M1 are positive integers; or select a time SR resource, a frequency SR resource, or a code SR resource for transmission of the SR that has the one-to-one association of the time and frequency SR resource where the selected eNodeB Tx beam is located.

In example 62, the subject matter of example 57 or any of the examples described herein may further include, wherein the one or more processors and memory are further configured to signal a transceiver of the UE to simultaneously transmit to the eNodeB the SR on N SR resources, where N is a positive integer, and N is predefined or configured by an advanced master information block (xMIB), an advanced system information block (xSIB), or radio resource control (RRC) signaling; wherein N SR transmissions correspond to N selected eNodeB Tx beams.

In example 63, the subject matter of example 57 or any of the examples described herein may further include, wherein the one or more processors and memory are further configured to: define L SR resources, where L is greater than K, and K is a number of BRS APs; define a one-to-many resource association between the BRS APs and the SR resource in a time and frequency domain; and randomly select one SR frequency resource to transmit the SR according to the one-to-many resource association between the BRS AP and the SR resource, wherein the UE includes at least one of an antenna, a touch sensitive display screen, a speaker, a microphone, a graphics processor, an application processor, a baseband processor, an internal memory, a non-volatile memory port, and combinations thereof.

Example 64 includes an apparatus of an eNodeB, the eNodeB configured to communicate with an User Equipment (UE), the apparatus comprising one or more processors and memory configured to: broadcast a beamforming reference signal (BRS) to enable the UE to select a selected eNodeB transmission (Tx) beam and a selected UE reception (Rx) beam based on a BRS received power (BRS-RP); process a scheduling request (SR) on a SR resource in a self-contained subframe, received from the UE, according to a time and frequency location of the selected eNodeB Tx beam; and encode, for transmission to the UE, an advanced physical downlink control channel (xPDCCH) for an uplink (UL) grant using the selected eNodeB TX beam.

Example 65 includes the apparatus of example 64, wherein the SR resource in a frequency domain is configured by higher layers via an advanced master information block (xMIB), an advanced system information block (xSIB), or using radio resource control (RRC) signaling, or wherein the SR resource in the self-contained subframe comprises an advanced physical downlink control channel (xPDCCH), a guard period (GP), one or more additional SR resources, and an advanced physical uplink control channel (xPUCCH), wherein the xPDCCH and the guard period are located within the UL self-contained subframe prior to the SR resource, the one or more additional SR resources, and the xPUCCH, wherein the xPUCCH is located after the SR resource and the one or more additional SR resources, or wherein the SR resource in the self-contained subframe comprises an advanced physical downlink control channel (xPDCCH), a guard period (GP), one or more additional SR resources, or a combination thereof, wherein the xPDCCH and the guard period are located within the self-contained subframe prior to the SR resource and the one or more additional SR resources.

Example 66 includes the apparatus of example 64 or 65, wherein the one or more processors and memory are further configured to: predefine or configure a subframe gap between a transmission of the BRS and a corresponding transmission of the SR resource by higher layers via an advanced master information block (xMIB), an advanced system information block (xSIB), or radio resource control (RRC) signalling; process a time and frequency SR, received from the UE, using a dedicated resource index that is configured by higher layers via a UE specific RRC signalling; wherein the time and frequency SR resource is selected by the UE for transmission of the SR to the eNodeB that has a one-to-one association on the time and frequency SR resource where the selected eNodeB Tx beam is located, wherein the dedicated resource index for transmission of the SR is a cyclic shift index, a comb index, or a combination of thereof; or process a time and code SR resource, received by the UE, that has the one-to-one association on the time and frequency SR resource where the selected eNodeB Tx beam is located, wherein a one-to-one association is defined between the SR resource and the BRS AP according to a time and code domain.

In example 67, the subject matter of example 64 or any of the examples described herein may further include, wherein the one or more processors and memory are further configured to: process a time, frequency, and code SR resource, received from a UE, that has a one-to-one association on the time and frequency SR resource where the selected eNodeB Tx beam is located; or process the SR on N SR resources, received by the UE, where N is a positive integer, and N is predefined or configured by an advanced master information block (xMIB), an advanced system information block (xSIB), or radio resource control (RRC) signalling, wherein N SR transmissions correspond to N selected eNodeB Tx beams, wherein the one or more processors and memory are further configured to process a randomly selected SR frequency resource, received from the UE according to a one-to-many resource association between the BRS AP and the SR resource.

Example 68 includes at least one machine readable storage medium having instructions embodied thereon for a User Equipment (UE) to communicate with an eNodeB, the instructions when executed cause the UE to: determine, at the UE, a selected eNodeB transmission (Tx) beam and a selected UE reception (Rx) beam from a beamforming reference signal (BRS) received power (BRS-RP); signal a transceiver of the UE to transmit to the eNodeB a scheduling request (SR), using the selected Rx beam, on a SR resource in a self-contained subframe according to a time and frequency location of the selected eNodeB Tx beam; and decode an advanced physical downlink control channel (xPDCCH), received from the eNodeB, for an uplink grant (UL) using the selected UE RX beam.

Example 69 includes the at least one machine readable storage medium of example 68, wherein the SR resource in a frequency domain is configured by higher layers via an advanced master information block (xMIB), an advanced system information block (xSIB), or using radio resource control (RRC) signaling, or wherein the SR resource in the self-contained subframe comprises an advanced physical downlink control channel (xPDCCH), a guard period (GP), one or more additional SR resources, and an advanced physical uplink control channel (xPUCCH), wherein the xPDCCH, the guard period are located within the UL self-contained subframe prior to the SR resource, the one or more additional SR resources, and the xPUCCH, wherein the xPUCCH is located after the SR resource and the one or more additional SR resources, or comprises an advanced physical downlink control channel (xPDCCH), a guard period (GP), one or more additional SR resources, wherein the xPDCCH and the guard period are located within the self-contained subframe prior to the SR resource and the one or more additional SR resources, or the SR occupies at least fourteen orthogonal frequency-division multiplexing (OFDM) symbols of the self-contained subframe.

Example 70 includes the at least one machine readable storage medium of example 68 or 69, further comprising instructions which when executed cause the UE to: define a one-to-one association between the SR resource and a BRS antenna port (AP); predefine or configure a subframe gap between transmission of the BRS and a corresponding transmission of the SR resource by higher layers via an advanced master information block (xMIB), an advanced system information block (xSIB), or radio resource control (RRC) signalling; define a one-to-one association between the SR resource and a BRS antenna port (AP) according to a time domain or a frequency domain; signal a transceiver of the UE to transmit to the eNodeB the SR using a dedicated resource index that is configured by higher layers via a UE specific RRC signalling; wherein the UE selects a time and frequency SR resource for transmission of the SR that has a one-to-one association on the time and frequency SR resource where the advance selected eNodeB Tx beam is located, wherein the dedicated resource index for transmission of the SR is a cyclic shift index, a comb index, or a combination of thereof; define a one-to-one association between the SR resource and the BRS AP according to a time and code domain, wherein the UE is configured with K SR resource index, where K is a total number of BRS APs; select a time and code SR resource for transmission of the SR that has the one-to-one association on the time and frequency SR resource where the selected eNodeB Tx beam is located; define a one-to-one association between the SR resource and the BRS AP according to a time, frequency, and code domain, wherein UE is configured with $M_0$ SR resource indexes, where $M_0$ is less than K; configure $M_1$ SR frequency resources by higher layers, where is $M_0$ multiplied by $M_1$ is equal to K according to equation $M_0 \cdot M_1 = K$; select a time, frequency, and code SR resource for transmission of the SR that has the one-to-one association on the time and frequency SR resource where the selected eNodeB Tx beam is located; or signal a transceiver of the UE to simultaneously transmit to the eNodeB the SR on N SR resources, where N is a positive integer, and N is predefined or configured by an advanced master information block (xMIB), an advanced system information block (xSIB), or radio resource control (RRC) signalling; wherein N SR transmissions correspond to N selected eNodeB Tx beams.

In example 71, the subject matter of example 68 or any of the examples described herein may further include, further comprising instructions which when executed cause the UE to: define L SR resource, where L is greater than K, and K is a number of BRS APs; define a one-to-many resource association between the BRS AP and the SR resource in a time and frequency domain; and randomly select one SR frequency resource to transmit the SR according to the one-to-many resource association between the BRS AP and the SR resource.

Example 72 includes a device to communicate with an eNodeB, the device comprising: means for determining a selected eNodeB transmission (Tx) beam and a selected UE reception (Rx) beam from a beamforming reference signal (BRS) received power (BRS-RP); means for signaling a transceiver of the device to transmit to the eNodeB a scheduling request (SR), using the selected Rx beam, on a SR resource in a self-contained subframe according to a time and frequency location of the selected eNodeB Tx beam; and means for processing an advanced physical downlink control channel (xPDCCH), received from the eNodeB, for an uplink grant (UL) using the selected UE RX beam.

Example 73 includes the device of example 72, wherein the SR resource in a frequency domain is configured by higher layers via an advanced master information block (xMIB), an advanced system information block (xSIB), or using radio resource control (RRC) signaling.

Example 74 includes the device of example 72, wherein the SR resource in the self-contained subframe comprises an advanced physical downlink control channel (xPDCCH), a guard period (GP), one or more additional SR resources, and an advanced physical uplink control channel (xPUCCH), wherein the xPDCCH, the guard period are located within the UL self-contained subframe prior to the SR resource, the one or more additional SR resources, and the xPUCCH, wherein the xPUCCH is located after the SR resource and the one or more additional SR resources, or comprises an advanced physical downlink control channel (xPDCCH), a guard period (GP), one or more additional SR resources, wherein the xPDCCH and the guard period are located within the self-contained subframe prior to the SR resource and the one or more additional SR resources, or the SR occupies at least fourteen orthogonal frequency-division multiplexing (OFDM) symbols of the self-contained subframe.

Example 75 includes the device of example 73, further comprising instructions means for: defining a one-to-one association between the SR resource and a BRS antenna port (AP); predefining or configure a subframe gap between transmission of the BRS and a corresponding transmission of the SR resource by higher layers via an advanced master information block (xMIB), an advanced system information block (xSIB), or radio resource control (RRC) signalling; defining a one-to-one association between the SR resource and a BRS antenna port (AP) according to a time domain or a frequency domain; signaling a transceiver of the device to transmit to the eNodeB the SR using a dedicated resource index that is configured by higher layers via a UE specific RRC signalling; wherein the device selects a time and frequency SR resource for transmission of the SR that has a one-to-one association on the time and frequency SR resource where the advance selected eNodeB Tx beam is located, wherein the dedicated resource index for transmission of the SR is a cyclic shift index, a comb index, or a combination of thereof; defining a one-to-one association between the SR resource and the BRS AP according to a time and code domain, wherein the device is configured with K SR resource index, where K is a total number of BRS APs; or selecting a time and code SR resource for transmission of the SR that has the one-to-one association on the time and frequency SR resource where the selected eNodeB Tx beam is located.

Example 76 includes the device of example 75, further comprising means for: defining a one-to-one association between the SR resource and the BRS AP according to a time, frequency, and code domain, wherein device is configured with $M_0$ SR resource indexes, where $M_0$ is less than K; configuring $M_1$ SR frequency resources by higher layers, where is $M_0$ multiplied by $M_1$ is equal to K according to equation $M_0 \cdot M_1 = K$; selecting a time, frequency, and code SR resource for transmission of the SR that has the one-to-one association on the time and frequency SR resource where the selected eNodeB Tx beam is located; or signaling a transceiver of the device to simultaneously transmit to the eNodeB the SR on N SR resources, where N is a positive integer, and N is predefined or configured by an advanced master information block (xMIB), an advanced system information block (xSIB), or radio resource control (RRC) signalling; wherein N SR transmissions correspond to N selected eNodeB Tx beams.

Example 77 includes the device of example 76, further comprising means for: defining L SR resource, where L is greater than K, and K is a number of BRS APs; defining a one-to-many resource association between the BRS AP and the SR resource in a time and frequency domain; and randomly selecting one SR frequency resource to transmit the SR according to the one-to-many resource association between the BRS AP and the SR resource.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A User Equipment (UE), the UE configured to communicate with a base station, the UE comprising one or more processors and memory configured to:
    select, at the UE, a selected base station transmission (Tx) beam and a selected UE reception (Rx) beam based on a beamforming reference signal (BRS) received power (BRS-RP);
    signal a transceiver of the UE to transmit to the base station a scheduling request (SR), using the selected Rx beam, on a scheduling request (SR) resource in a subframe according to a time and frequency location of the selected base station Tx beam; and
    decode a physical downlink control channel (PDCCH), received from the base station, for an uplink (UL) grant using the selected UE Rx beam.

2. The UE of claim 1, wherein the SR resource in a frequency domain is configured by higher layers via a master information block (MIB), a system information block (SIB), or using radio resource control (RRC) signaling, and the selected Tx beam and the selected Rx beam are selected based on the BRS-RP measurement for a plurality of selected UE Rx beams received at the UE.

3. The UE of claim 2, wherein the SR resource in the subframe comprises a physical downlink control channel (PDCCH), a guard period (GP), one or more additional SR resources, and a physical uplink control channel (PUCCH), wherein the PDCCH and the guard period are located within the subframe prior to the SR resource, the one or more additional SR resources, and the PUCCH, wherein the PUCCH is located after the SR resource and the one or more additional SR resources.

4. The UE of claim 2, wherein the SR resource in the subframe comprises a physical downlink control channel (PDCCH), a guard period (GP), one or more additional SR resources, wherein the PDCCH and the guard period are located within the subframe prior to the SR resource and the one or more additional SR resources.

5. The UE of claim 1, wherein the one or more processors and memory are further configured to define a one-to-one association between the SR resource and a BRS antenna port (AP).

6. The UE of claim 5, wherein the one or more processors and memory are further configured to:
    define the one-to-one association between the SR resource and the BRS AP according to a time domain or a frequency domain; and
    signal a transceiver of the UE to transmit to the base station the SR using a dedicated resource index that is configured by higher layers via a UE specific RRC signalling;
    wherein the UE selects a time and frequency SR resource for transmission of the SR that has a one-to-one association on the time and frequency SR resource where the selected base station Tx beam is located.

7. The UE of claim 6, wherein the dedicated resource index for transmission of the SR is a cyclic shift index, a comb index, or a combination thereof.

8. The UE of claim 6, wherein the one or more processors and memory are further configured to:
    define the one-to-one association between the SR resource and the BRS AP according to a time and code domain, wherein the UE is configured with K SR resource index, where K is a total number of BRS APs; and
    select a time and code SR resource for transmission of the SR that has the one-to-one association on the time and frequency SR resource where the selected base station Tx beam is located.

9. The UE of claim 8, wherein the one or more processors and memory are further configured to:
    define the one-to-one association between the SR resource and the BRS AP according to a time, frequency, or code domain, wherein the UE is configured with $M_0$ SR resource indexes, where $M_0$ is less than K; and
    configure $M_1$ SR frequency resources by higher layers, where $M_0$ multiplied by $M_1$ is equal to K according to an equation $M_0 \cdot M_1 = K$, wherein $M_0$ and $M_1$ are positive integers; and
    select a time SR resource, a frequency SR resource, or a code SR resource for transmission of the SR that has the one-to-one association of the time and frequency SR resource where the selected base station Tx beam is located.

10. The UE of claim 9, wherein the one or more processors and memory are further configured to signal a transceiver of the UE to simultaneously transmit to the base station the SR on N SR resources, where N is a positive integer, and N is predefined or configured by a master information block (MIB), a system information block (SIB), or radio resource control (RRC) signaling;
    wherein N SR transmissions correspond to N selected base station Tx beams.

11. The UE of claim 10, wherein the one or more processors and memory are further configured to:
    define L SR resources, where L is greater than K, and K is a number of BRS APs;
    define a one-to-many resource association between the BRS APs and the SR resource in a time and frequency domain; and
    randomly select one SR frequency resource to transmit the SR according to the one-to-many resource association between the BRS AP and the SR resource.

12. The UE of claim 1, wherein the UE includes at least one of an antenna, a touch sensitive display screen, a speaker, a microphone, a graphics processor, an application processor, a baseband processor, an internal memory, a non-volatile memory port, and combinations thereof.

13. A base station, the base station configured to communicate with a User Equipment (UE), the base station comprising one or more processors and memory configured to:
broadcast a beamforming reference signal (BRS) to enable the UE to select a selected base station transmission (Tx) beam and a selected UE reception (Rx) beam based on a BRS received power (BRS-RP);
process a scheduling request (SR) on a SR resource in a subframe, received from the UE, according to a time and frequency location of the selected base station Tx beam; and
encode, for transmission to the UE, a physical downlink control channel (PDCCH) for an uplink (UL) grant using the selected base station Tx beam.

14. The base station of claim 13, wherein the SR resource in a frequency domain is configured by higher layers via a master information block (MIB), a system information block (SIB), or using radio resource control (RRC) signaling.

15. The base station of claim 13, wherein the SR resource in the subframe comprises a physical downlink control channel (PDCCH), a guard period (GP), one or more additional SR resources, and a physical uplink control channel (PUCCH), wherein the PDCCH and the guard period are located within the subframe prior to the SR resource, the one or more additional SR resources, and the PUCCH, wherein the PUCCH is located after the SR resource and the one or more additional SR resources.

16. The base station of claim 13, wherein the SR resource in the subframe comprises a physical downlink control channel (PDCCH), a guard period (GP), one or more additional SR resources, or a combination thereof, wherein the PDCCH and the guard period are located within the subframe prior to the SR resource and the one or more additional SR resources.

17. The base station of claim 16, wherein the one or more processors and memory are further configured to predefine or configure a subframe gap between a transmission of the BRS and a corresponding transmission of the SR resource by higher layers via a master information block (MIB), a system information block (SIB), or radio resource control (RRC) signalling.

18. The base station of claim 17, wherein the one or more processors and memory are further configured to process a time and frequency SR, received from the UE, using a dedicated resource index that is configured by higher layers via a UE specific RRC signalling;
wherein the time and frequency SR resource is selected by the UE for transmission of the SR to the base station that has a one-to-one association on the time and frequency SR resource where the selected base station Tx beam is located, wherein the dedicated resource index for transmission of the SR is a cyclic shift index, a comb index, or a combination thereof.

19. The base station of claim 18, wherein the one or more processors and memory are further configured to process a time and code SR resource, received by the UE, that has the one-to-one association on the time and frequency SR resource where the selected base station Tx beam is located, wherein a one-to-one association is defined between the SR resource and the BRS AP according to a time and code domain.

20. The base station of claim 19, wherein the one or more processors and memory are further configured to: process a time, frequency, and code SR resource, received from a UE, that has the one-to-one association on the time and frequency SR resource where the selected base station Tx beam is located.

* * * * *